United States Patent [19]
Titus et al.

[11] Patent Number: 5,847,353
[45] Date of Patent: Dec. 8, 1998

[54] METHODS AND APPARATUS FOR LOW $NO_x$ EMISSIONS DURING THE PRODUCTION OF ELECTRICITY FROM WASTE TREATMENT SYSTEMS

[75] Inventors: Charles H. Titus, Newtown Square, Pa.; Daniel R. Cohn, Chestnut Hill, Mass.; Jeffrey E. Surma, Kennewick, Wash.

[73] Assignee: Integrated Environmental Technologies, LLC, Carle Place, N.Y.

[21] Appl. No.: 693,425

[22] Filed: Aug. 7, 1996

Related U.S. Application Data

[63] Continuation-in-part of Ser. No. 621,424, Mar. 25, 1996, and Ser. No. 622,762, Mar. 25, 1996, said Ser. No. 621,424, and Ser. No. 622,762, which is a continuation-in-part of Ser. No. 492,429, Jun. 19, 1995, which is a continuation-in-part of Ser. No. 382,730, Feb. 2, 1995, Pat. No. 5,666,891.

[51] Int. Cl.⁶ .................................................. B23K 10/00
[52] U.S. Cl. ............................... 219/121.36; 219/121.44; 219/121.37; 110/246; 373/18; 588/900
[58] Field of Search ........................ 219/121.43, 121.44, 219/121.59, 121.36, 121.37, 121.38; 110/246, 249, 250, 346; 373/18–22; 588/900

[56] References Cited

U.S. PATENT DOCUMENTS

| | | | |
|---|---|---|---|
| 4,466,824 | 8/1984 | Gavin et al. | 75/10 R |
| 5,240,656 | 8/1993 | Scheeres | 264/37 |
| 5,363,826 | 11/1994 | Takoaka | 123/486 |
| 5,409,784 | 4/1995 | Bromberg et al. | |
| 5,425,332 | 6/1995 | Rabinovich et al. | |
| 5,437,250 | 8/1995 | Rabinovich et al. | |
| 5,451,738 | 9/1995 | Alvi et al. | 219/121.59 |
| 5,484,978 | 1/1996 | Hedberg et al. | 219/121.59 |
| 5,552,675 | 9/1996 | Lemelson | 315/111.21 |
| 5,611,307 | 3/1997 | Watson | 123/254 |

*Primary Examiner*—Mark H. Paschall
*Attorney, Agent, or Firm*—Choate, Hall & Stewart

[57] ABSTRACT

Methods and apparatus for high efficiency generation of electricity and low oxides of nitrogen ($NO_x$) emissions are provided. The electricity is generated from combustion of hydrogen-rich gases produced in waste conversion units using ultra lean fuel to air ratios in the range of 0.4–0.7 relative to stoichiometric operation in internal combustion engine-generators or ultra lean operation in gas turbines to ensure minimal production of pollutants such as $NO_x$. The ultra lean operation also increases the efficiency of the internal combustion engine. High compression ratios ($r=12$ to 15) can also be employed to further increase the efficiency of the internal combustion engine. Supplemental fuel, such as natural gas or diesel oil, may be added directly to the internal combustion engine-generator or gas turbine for combustion with the hydrogen-rich gases produced in waste conversion unit. In addition, supplemental fuel may be reformed into a hydrogen-rich gas in a plasma fuel converter and then introduced into the internal combustion engine-generator or a gas turbine for combustion along with supplemental fuel and the hydrogen-rich gases produced in waste conversion unit. The preferred embodiment of the waste conversion unit is a fully integrated tunable arc plasma-joule heated melter with a common molten pool and power supply circuits which can be operated simultaneously without detrimental interaction with one another. In this embodiment, the joule heated melter is capable of maintaining the material in a molten state with sufficient electrical conductivity to allow rapid restart of a transferred arc plasma.

56 Claims, 19 Drawing Sheets

METHODS AND APPARATUS FOR LOW NO$_x$ EMISSIONS DURING THE PRODUCTION OF ELECTRICITY FROM WASTE TREATMENT SYSTEMS

CROSS-REFERENCE TO RELATED APPLICATIONS

This application is a continuation-in-part application of U.S. Ser. Nos. 08/621,424 and 08/622,762, both filed Mar. 25, 1996, both now pending and both of which are continuations-in-part applications of U.S. Ser. No. 08/492,429, filed Jun. 19, 1995, now pending and which is a continuation-in-part application of U.S. Ser. No. 08/382,730, filed Feb. 2, 1995, now U.S. Pat. No. 5,666,891; all of which are incorporated herein by reference.

TECHNICAL FIELD

The present invention generally relates to the generation of electricity with reduced NO$_x$ emissions, and more particularly to the generation of electricity with reduced NO$_x$ emissions from combustion of gases produced from waste conversion units.

BACKGROUND OF THE INVENTION

The disposal of municipal solid waste (MSW) and other waste has become a major issue over the past few decades due to space limitations for landfills and problems associated with siting new incinerators. In addition, increased environmental awareness has resulted in a major concern of many large metropolitan areas and to the country as a whole to ensure that the disposal of solid waste is properly handled. See e.g., USA EPA, The Solid Waste Dilemma: An Agenda for Action, EPA/530-SW-89-019, Wash., D.C. (1989).

Attempts have been made to reduce the volume and recover the energy content of MSW through incineration and cogeneration. The standard waste-to-energy incinerator will process the solid combustible fraction of the waste stream, produce steam to drive a steam turbine, and as a result of the combustion process produce a waste ash material. Typically, the ash is buried in a municipal landfill. Current trends and recent rulings, however, may require such material to be shipped to landfills permitted for hazardous waste. This will substantially increase ash disposal costs. Moreover, there is increased public concern about gaseous emissions from landfills and the possibility of contamination of groundwater. Another disadvantage associated with incinerator systems is the production of large quantities of gaseous emissions resulting in the need for costly air pollution control systems in an attempt to decrease emission levels to comply with requirements imposed by regulatory agencies.

In order to overcome the shortcomings associated with incinerator systems, attempts have been made in the prior art to utilize arc plasma torches to destroy toxic wastes. The use of arc plasma torches provides an advantage over traditional incinerator or combustion processes under certain operating conditions because the volume of gaseous products formed from the plasma arc torch may be significantly less than the volume produced during typical incineration or combustion, fewer toxic materials are in the gaseous products, and under some circumstances the waste material can be classified.

For example, U.S. Pat. No. 5,280,757 to Carter et al. discloses the use of a plasma arc torch in a reactor vessel to gasify municipal solid waste. A product having a medium quality gas and a slag with a lower toxic element leachability is produced thereby.

U.S. Pat. No. 4,644,877 to Barton et al. relates to pyrolytic destruction of polychlorinated biphenyls (PCBs) using a plasma arc torch. Waste materials are atomized and ionized by a plasma arc torch and are then cooled and recombined into gas and particulate matter in a reaction chamber. U.S. Pat. No. 4,431,612 to Bell et al. discusses a hollow graphite electrode transfer arc plasma furnace for treatment of hazardous wastes such as PCBs.

A process for remediation of lead-contaminated soil and waste battery material is disclosed in U.S. Pat. No. 5,284,503 to Bitler et al. A vitrified slag is formed from the soil. Combustible gas and volatized lead, which are formed from the waste battery casings, are preferably transferred to and used as a fuel for a conventional smelting furnace.

The systems proposed by Barton et al, Bell et al, Carter et al, and Bitler et al have significant disadvantages. For example, such disadvantages include insufficient heating, mixing and residence time to ensure high quality, nonleachable glass production for a wide range of waste feeds. Additionally, hearth size and feeder design are significantly limited since furnace walls must be relatively close to the arc plasma which is the only heat source. High thermal stress on the walls of the furnace often occurs as a result of the limitation on the hearth size.

Prior art arc plasma furnaces with metal electrodes further may be limited by short electrode lifetime when used at higher DC current. Therefore, to achieve higher power output, the arc potential must be raised by lengthening the arc. This results in radiative thermal losses to the furnace side walls and leads to metal electrode (torch) ineffectiveness. In addition, there are often difficulties associated with prior art transfer arc plasmas in start-up and restarting of such arc plasma systems when cold, nonelectrically conducting material is being processed.

Another disadvantage associated with prior art systems is the inefficient use of combustible gases produced during conversion of waste materials. For example, combustion of gases often does not result in a high conversion rate and is thus inefficient. In addition, the combustion of such gases frequently results in the emission of pollutants such as oxides of nitrogen (NO$_x$) in amounts that render the process environmentally unattractive.

Thus, while such prior art attempts have been useful, there remains a need in the art for a robust, easy to operate waste conversion system which minimizes hazardous gaseous emissions and which maximizes conversion of a wide range of solid waste into useful energy and produces a product stream which is in a safe, stable form for commercial use or which does not require special hazardous waste considerations for disposal. It would therefore be desirable to provide a robust, user friendly and highly flexible method and apparatus for processing and converting a wide range of waste materials into useful energy and stable products while minimizing hazardous gaseous emissions, thereby overcoming the shortcomings associated with the prior art. It would also be desirable to provide robust, user friendly and highly flexible methods and apparatus for processing and converting a wide range of waste materials into useful gases for generating electricity in a manner that results in a high conversion rate and that significantly reduces emission of pollutants.

SUMMARY OF THE INVENTION

It is an object of the present invention to provide a method and apparatus for increased conversion of solid waste materials such as municipal and industrial waste to useful energy with greatly reduced air pollution.

It is another object of the present invention to provide a method and apparatus for converting a wide range of waste materials to useful commercial products or to a safe, stable product which is suitable for disposal.

It is another object of the invention to provide a method and apparatus for converting waste materials using a combination of an independently controllable arc plasma and joule heated melter as an integrated system.

It is still another object of the invention to provide a method and apparatus for converting waste materials using an arc plasma which provides heated material to a joule heated melter in a directly coupled integrated system.

It is a further object of the invention to provide a method and apparatus for converting waste materials using a fully integrated joule heated melter and arc plasma unit.

It is yet a further object of the invention to provide a method and apparatus for converting waste materials in which a joule heated melter and an arc plasma in a fully integrated system are operated simultaneously with a common molten pool without detrimental interaction of the power supplies and with independent control of the power to each.

It is yet a further object of the invention to provide a method and apparatus for vitrifying waste materials using a combination joule heated melter and arc plasma as an integrated system.

It is still a further object of the invention to provide a method and apparatus for converting waste materials using fast pyrolysis, thereby providing a high purity gas suitable for combustion.

It is yet a further object of the present invention to provide a method and apparatus for a highly effective conversion of waste materials to gaseous fuel capable of generating electricity through a small, highly efficient gas turbine or internal combustion engine.

It is still a further object of the invention to provide a waste conversion unit that can be self-powered or can provide a given level of electricity for outside use by utilizing an auxiliary fuel, such as natural gas, diesel or some other fuel, in varying amounts in the gas turbine or internal combustion engine.

It is still a further object of the invention to provide environmentally attractive systems involving the operation of spark ignition internal combustion engines at ultra lean ratios of fuel to air (in the range of about 0.4–0.7 relative to stoichiometric ratios) and at very high compression ratios, e.g. r in the range from about 12 to 15, or for operating turbines at ultra lean ratios of fuel to air so as to significantly reduce levels of $NO_x$ production.

It is still a further object of the invention to allow for variable fuel operation by providing control and fuel processing systems which ensure that ultra lean, high compression ratio engine requirements for smooth burn ignition and lack of knock are met under continually varying fuel conditions.

These and other objects of the invention are provided by a system which is capable of processing municipal solid waste (MSW), industrial waste or other waste forms into stable nonleachable products (e.g. crystalline and noncrystalline products) which are suitable for use commercially or which can be disposed of without risk to the environment. The system also minimizes air emissions and maximizes production of a useful gas product for the production of electricity.

The present invention provides a compact waste-to-energy processing system that has the advantage of complete or substantially complete conversion of waste materials into a useful gas and a product stream at a single location. In addition, the product stream may be used in a variety of commercial applications. Alternatively, the product stream, which is in a safe, stable waste form, does not require special hazardous considerations for disposal.

The combination of the arc plasma furnace and the joule heated melter as an integrated system with gas turbine or internal combustion engine generating equipment provides a self-powered waste treatment and power production facility which is capable of being deployed in relatively small modular units and which can be easily scaled to handle large volumes of municipal solid waste.

The primary processing unit preferably includes a DC or AC electrode arc plasma for heating waste material and which also has joule heating capability for the melt pool. Preferably, the electrode arc or arcs is a DC electrode arc or arcs with electrodes formed of graphite. The use of a DC arc electrode in combination with a special electrical circuit ensures simultaneous independent control of the arc plasma and the joule heated melter. The primary mode of operation of the arc plasma and joule heated melter is pyrolysis (oxygen starved operation). In a preferred embodiment, the system is operated such that fast pyrolysis occurs, thereby producing a gas with higher purity as compared with other methods of pyrolysis.

One embodiment of the invention utilizes a combination of an arc plasma furnace which provides heated material to a joule heated melter coupled to the arc plasma furnace. Inductive heating and/or mixing coils may be utilized to provide additional heating and/or mixing in the melt pool.

In another preferred embodiment of the present invention, the arc plasma and joule heated melter components are fully integrated with a common molten pool such that the system is capable of simultaneous independently controllable, i.e. tunable, operation of these components. The arc plasma occurs between a graphite electrode or electrodes and the molten material. Graphite is the preferred arc electrode material rather than metal since graphite electrodes simplify the process and since graphite has much higher current capability than a metal electrode in a plasma torch. In addition, graphite electrodes require less maintenance relative to the frequent tip replacements of the metal electrode plasma torch systems. It should be appreciated, however, that other metallics elements such as tungsten or the like may be utilized as the electrode material.

The tunable fully integrated system employs electrical and mechanical design features to maximize flexibility and effectiveness. The benefits of this embodiment of the invention include, but are not limited to, high processing rates for vitrification of a large variety of materials into high quality, stable, non-leachable glass and reduced volume requirements due to the integrated system. The joule heated melter provides deep volume heating and is capable of maintaining a constant temperature throughout the melt pool with uniform mixing characteristics, thereby resulting in a high quality, homogenous glass product. The arc plasma provides the necessary radiant surface heating for processing feed material in a highly efficient manner and at significantly higher rates than other technologies. Simultaneous independently controllable operation of the arc plasma and joule heated melter is provided by predetermined arc melter configurations and electrical circuits. While not meant to be limiting, the arc plasma preferably is operated by a DC arc and the joule heated melter is operated by AC power. The DC arc and AC powered joule heated melter arrangement ensures the ability to independently control and operate each component.

The use of the melter in combination with the arc plasma provides more uniform heating than prior art techniques. In addition, utilizing deep volume heating provided by the joule heated glass melter facilitates ease of operation. It also provides the constant heat source necessary to maintain sufficient electrical conductivity in the waste material for rapid restart of the arc plasma which uses an electrical conduction path through the waste material. Additionally, the fully integrated system allows the furnace walls to be further from the arc plasma since there is an additional heat source provided. The increase in wall distance from the arc plasma increases feed options and reduces thermal stress on the furnace lining. Consequently, thermally sensitive, highly durable, long-life refractory linings can be employed. The present invention also allows the use of electrodes having a long life and a very wide range of arc plasma and joule heater power levels.

The independent control of the arc plasma and the joule heated melter power provides a continuously tunable mix of surface and deep volume heating, which can be optimized for different phases of operation. For example, additional heating may be required for pouring glass or maintaining the glass pool temperature while additional surface heating may be necessary during the initiation of feeding. In addition, different mixes of surface and volume heating are appropriate for different waste streams. The ratio of surface to deep volume heating may be less for municipal waste, for example, than for industrial waste containing large amounts of metals and high temperature materials.

The high quality, vitrified products produced in accordance with the present invention may be used in a variety of applications. For example, the vitrified products may be crushed and incorporated into asphalt for use in roads and the like. Alternatively, the vitrified products may be utilized to replace cinder in cinder or building blocks, thereby minimizing absorption of water within the block. Further, the vitrified products may be solidified to a final form which exhibits substantial volume reduction over prior art vitrification products. The products formed in accordance with the present invention can also be of a crystalline structure or a combination of crystalline and non-crystalline structures. The solidified forms are suitable for disposal without health risks or risks to the environment.

In another embodiment of the invention, environmentally attractive low emission internal combustion engine-generator systems (or gas turbine systems) for waste treatment units are provided to greatly improve efficiency and pollution reduction. This is accomplished by utilizing multi-fuel (e.g. hydrogen-rich gas, natural gas, diesel oil) operation of the spark ignition engine or turbine at ultra lean ratios of fuel to air. Ultra lean operation is made possible by the fast flame front characteristic of the hydrogen in the hydrogen-rich gas produced by the waste treatment unit. In addition, very high compression ratios could be used in the internal combustion engine. Variable fuel operation is made possible by control and fuel processing systems that ensure that ultra lean, high compression ratio engine requirements for smooth burn ignition and lack of knock are met under continually varying fuel conditions.

It is expected that the high efficiency, low emission internal combustion engine-generator systems could increase the efficiency of conversion of gaseous fuel to electricity by up to approximately 40% (for example from 30 to 42%). It is also expected that by operating at ultra lean conditions such systems can reduce $NO_x$ emission by factors of more than ten relative to standard internal combustion engine-generator systems. An additional objective of the invention is to provide an option to utilize such systems to reduce carbon monoxide and hydrocarbon emissions by factors of more than ten by using highly robust and simple oxidation catalysts.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which.

Similar reference characters refer to similar parts throughout the several views of the drawings.

DETAILED DESCRIPTION OF THE PREFERRED EMBODIMENTS

Figure 1A:
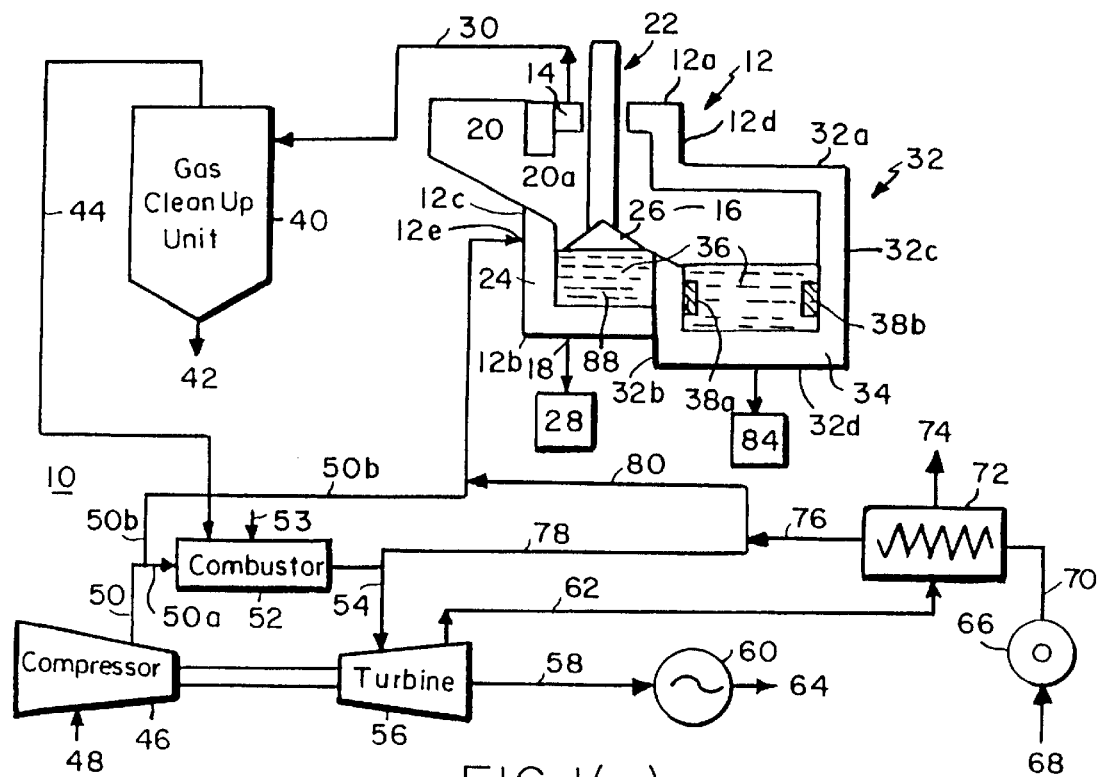
FIG. 1(a) is a schematic view of a flow diagram illustrating the process and apparatus suitable for use in the present invention in which the arc plasma provides heated material to the melter in a directly coupled integrated system.

Referring now to FIG. 1(a), a schematic view of a process and apparatus suitable for use in accordance with the present invention is shown. System 10 includes a primary processing unit having arc plasma furnace 12 and melt chamber 32. As shown in greater detail in FIG. 2, arc plasma furnace 12 is constructed such that the amount of oxygen present in the furnace can be controlled. Furnace 12 includes top 12a, bottom 12b and sides 12c and 12d. In addition, furnace 12 preferably includes at least four ports, illustrated in FIG. 1 as 14, 16, 18 and 20a. As discussed herein, opening 14 allows gas formed in arc furnace 12 to be discharged through opening 14 to fuel gas line 30 and processed for use as a fuel gas. Opening or gas discharge port 14 may be formed of any conventional material which allows controlled discharge of a combustible gas. For example and while not meant to be limiting, gas discharge from furnace 12 may be controlled by a flow control valve or the like at opening 14. It is preferred that gas discharge port 14 be positioned at or near top 12a of furnace 12. Alternatively, gas discharge port 14 may be positioned in chamber 32 as shown in FIGS. 2(a)–2(e).

As further shown in FIGS. 1(a), 1(b) and 2(a)–2(e), opening 16 allows slag or glass material formed in furnace 12 to flow into joule heated melter 32. Flow through opening or port 16 is preferably controlled by constructing furnace 12 to have an angled wall 12d such as that shown in FIG. 2. In this manner, slag material 36 accumulates in furnace 12 until a predetermined level is reached, forcing slag 36 to flow over wall 12d and into melter 32. While not meant to be limiting, wall 12d may be formed at angle of about 45° as shown in FIGS. 2(a)–2(e). The level at which slag begins to flow over wall 12d into melter 32 is determined based on the desired residence time in the furnace and the feed rate for waste material. This construction also permits glass to be removed continuously while simultaneously preventing entrance or egress of gas.

Opening or metal discharge port 18 allows metal which has formed and collected in furnace 12 to be discharged and separated from the gases and slag formed in furnace 12. Discharge port 18 is constructed in any manner which is capable of controlling the discharge of molten metal material from furnace 12. For example, a flow control valve or equipment may be used to control flow through discharge port 18 to metal collector 28. Preferably, opening 16 is positioned on side 12d of furnace 12 as shown in FIGS. 1(a), 1(b) and 2(a)–2(e) and metal discharge 18 is positioned at or near bottom 12b of furnace 12. While not meant to be limiting, furnace 12 may be designed such that bottom 12b is angled as shown in FIGS. 2(a)–2(e).

Waste material entry port 20a is positioned such that waste material 26 is fed from waste feed system 20 through port 20a to furnace 12 in a controlled manner. While not to be construed as limiting, port 20a may include a flow control valve or the like to monitor the feed rate of waste material 26. Feed system 20 may be any conventional type of feed system which is capable of feeding municipal solid waste or other waste such as hazardous waste, hospital waste, ash from an incinerator or the like to furnace 12 so long as the feed system does not allow air to enter the furnace through the feed system.

As also shown in FIG. 1(a), furnace 12 may include additional ports such as air or gas entry port 12e. Air or gas entry port 12e includes flow control, such as a flow control valve or the like. Preferably, port 12e is positioned to enter through the furnace wall at a level proximate to slag material 36 as shown in FIG. 1(a). In this manner, air 50b (which may contain a predetermined amount of steam 80), is injected into furnace 12 at a controlled rate and time during the conversion process to control the composition of the gas exiting the furnace. In addition, air and/or steam may be introduced through opening 12e to ensure that any carbon in the feed material has been converted to carbon-containing gases such as CO, $CO_2$, $H_2$, $CH_4$ and the like. This reduces the amount of charring during the process which may result when carbon is not completely converted to carbon-containing gases.

Refractory 24 is utilized to line furnace 12. Refractory 24 may be formed of any suitable material capable of handling temperatures in excess of about 1400° C. For example and while not meant to be limiting, furnace 12 and portions of refractory 24 may be formed of ceramic or graphite. Refractory 24 may also be formed of high durability refractory materials such as fused chrome alumina spinel, zircon, alumina-zirconia-silica and combinations thereof. It will be appreciated that other durable refractory materials are suitable for use in the invention. These materials can also be thermally shock sensitive.

Furnace 12 includes electrode or electrodes 22, which are preferably formed of graphite. It is preferred to use graphite as electrode material rather than metal since graphite electrodes simplify the process and have much higher current capability than those used in a metal torch. In addition, graphite electrodes require less maintenance relative to the frequent tip replacements of the metal torch systems. Due to the anticipated conditions in the furnace plenum involving both partial oxidizing environments and conditions promoting the water-gas reaction:

$C+H_2O \rightarrow CO+H_2$ at 600°–1000° C., there may be unacceptable consumption of graphite without special provisions. Therefore, graphite electrode 22 is preferably coated with zirconia, silicon carbide, boron nitride or another protective coating to minimize graphite consumption and prolong useful life. For example, when municipal solid waste containing carbonaceous material is fed to furnace 12, a highly endothermic reaction occurs requiring approximately 600 kW-hours/ton municipal solid waste to convert combustible material to fuel gas and incombustible material to slag.

Electrode or electrodes 22 may be operated with either an AC or DC arc in furnace 12. It is preferred however, to utilize a DC arc in furnace 12 rather than an AC arc as the use of a DC arc enhances arc stability and can reduce electrode consumption. Metal, which may accumulate at the bottom of furnace 12, is capable of being removed through metal discharge port 18. Furnace 12 may also include one or more electrodes 86a, 86b preferably positioned at or near bottom 12b of furnace 12.

Electrode or electrodes 22 are preferably positioned in the furnace 12 at a sufficient distance from the walls such that feed material 26 can shield or protect the walls from thermal radiation. This facilitates the use of materials such as fused chrome alumina spinel, zircon, alumina-zirconia-silica and combinations thereof as refractory materials.

Melt chamber 32, which includes top 32a, bottom 32d and sides 32c and 32b, is joule heated and is preferably directly coupled to furnace 12. Joule heated melter 32 is heated using either AC or DC power. In a preferred embodiment, joule heated melter 32 is heated with AC power while arc electrode 22 utilizes DC power. The energy requirements to maintain slag 36 at the proper temperature are equal to the heat losses from the melter outer surface. This is expected to be very low, i.e. about 20–30 KW/m$^2$ of slag or glass surface area for a properly designed melt chamber. One advantage of having melter 32 closely coupled to arc furnace 12 is that melter 32 provides additional melt volume, thereby providing a longer residence time in the process and elimination of metal short circuiting the electrodes in the bottom of the joule heated melter. This results in a more homogeneous slag or glass product which is removed from system 10 by slag discharge port 82.

Refractory 34 acts as a lining for joule heated melter 32 and may be formed of any material capable of withstanding temperatures of about 1600° C. For example, refractory 34 may be formed of ceramic or the like. Refractory 34 may also be formed of high durability refractory materials such as fused chrome alumina spinel, zircon, alumina-zirconia-silica and combinations thereof. It will be appreciated that other durable refractory materials are suitable for use in the invention. These materials can also be thermally shock sensitive. Electrodes 38a, 38b are preferably positioned in melter 32 such that when slag 36 enters melter 32, electrodes 38a and 38b are submerged therein. As shown in FIGS. 1(a), 1(b), and 2(a)–2(e) for example, electrode 38a may be placed on one side 32b of melter 32, while electrode 38b is placed on the opposite side 32c of melter 32 such that AC or DC current is capable of flowing therebetween. Preferably, electrodes 38a, 38b are positioned at or near the bottom 32d of melter 32. It should be noted, however, that any arrangement of electrodes 38a, 38b is suitable for use in accordance with the invention so long as sufficient current is capable of passing through slag 36. It should also be noted that melter 32 may also include additional electrodes 38c such as that shown in FIGS. 2(a)–2(e).

Melter 32 may also include auxiliary heater system 90. As illustrated in FIGS. 2(a)–2(e), auxiliary heater 90 includes one or more heaters 92, conduit 98, slag pouring conduit 94, port 96 and slag collector 100. While not to be construed as limiting, FIGS. 2(a)–2(e) illustrate several alternative constructions for the positioning of conduit 98 in auxiliary heater system 90. Slag 36 flows from melter 32 through conduit 98, where it is heated by heaters 92. Slag 36 then flows through slag pouring conduit 94 to port 96 and is discharged therefrom to slag collector 100. Port 96 may include a flow control valve or the like to control the discharge of slag 36 from heat system 90. Auxiliary heater system 90 is utilized when it is desirable to decrease the viscosity of the slag in order to maintain the slag level in the melter. The auxiliary heater system also compensates for heat loss as the slag approaches the slag discharge prior to dropping into the slag container. As illustrated in FIGS. 2(a)–2(e), slag therefore may be collected in containers 84 and/or 100. When hazardous waste is being processed, it may be desirable to have containers 28, 84 and 100 sealably connected to ports 18, 82 and 96, respectively, in a manner such that air and/or gases do not enter or exit the system therethrough.

The process of the present invention will now be described. Waste material 26 is fed from feed system 20 through entry port 20a into furnace 12. As mentioned above, arc furnace 12 preferably includes graphite electrode or electrodes 22 operating with a DC arc. This arrangement is particularly suitable for processing solid waste material into glass or slag and a useful gas.

The arc 216 in furnace 12 is preferably designed to contact directly feed material 26. Two types of power supply arrangements are suitable for use in the present invention to convert three phase AC power into DC power in order to initiate and maintain a stable DC arc in arc furnace 12.

Figure 3A:
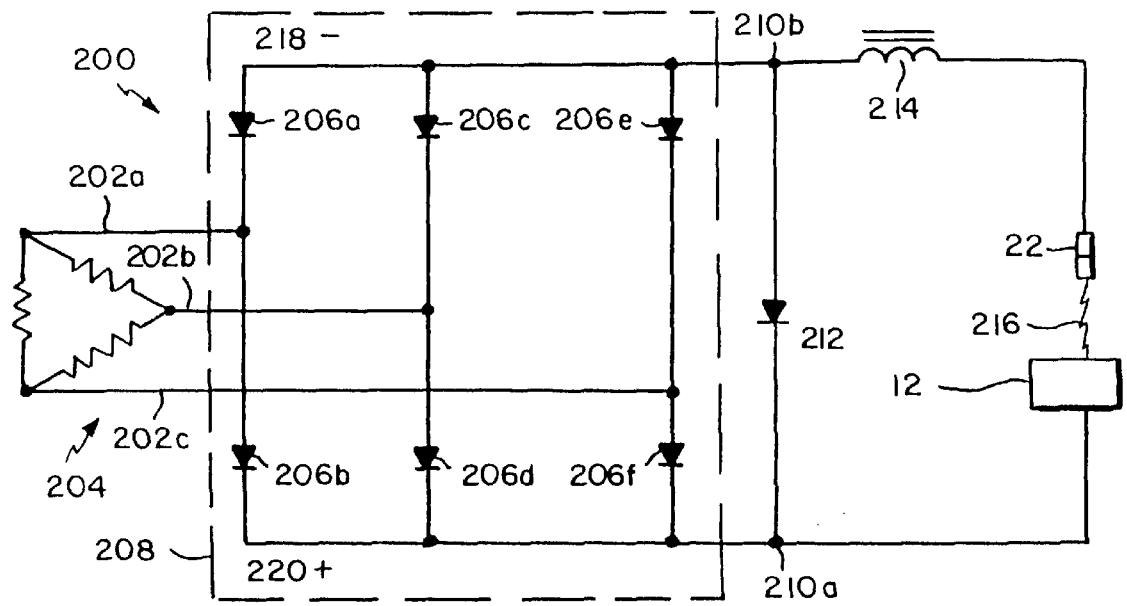
FIGS. 3(a) and 3(b) illustrate DC power system arrangements only for the arc plasma portion of the arc furnace and joule heated melter arrangements shown in FIGS. 1(a), 1(b) and 2(a)–2(e)
Figure 3B:
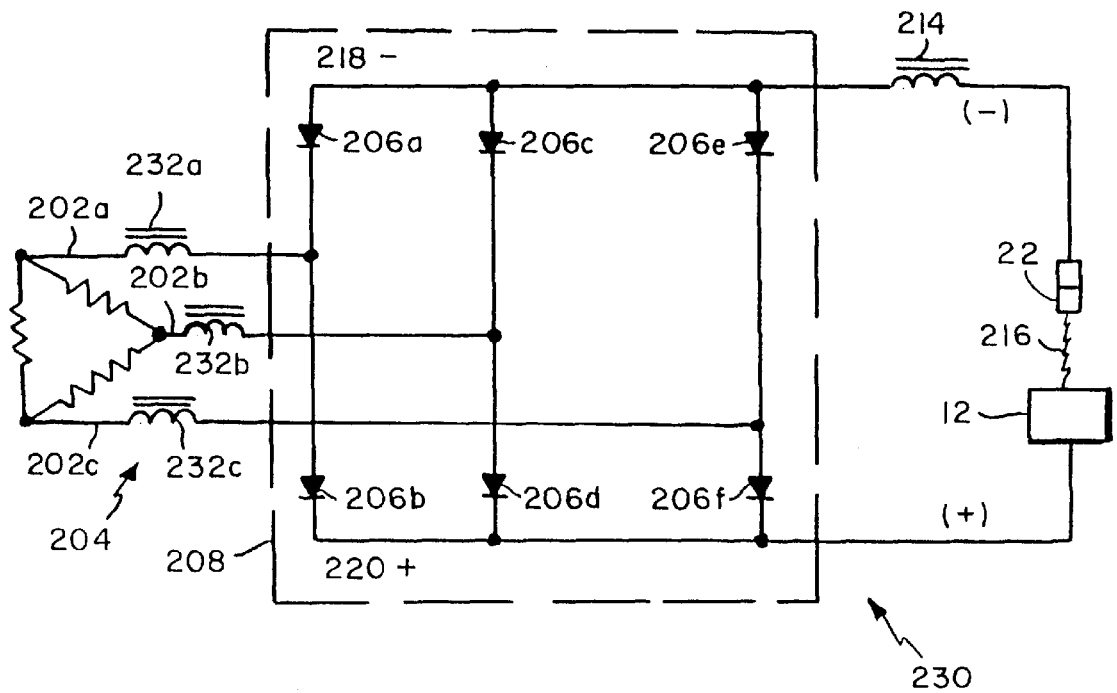

FIGS. 3(a) and 3(b) illustrate DC power system arrangements only for the arc plasma portion of the arc furnace and joule heated melter arrangement shown in FIGS. 1 and 2. The joule heated melter portion of this combined system may utilize a conventional AC power system such as those presently used by and available from Pacific Northwest Laboratories or the Department of Energy. As shown in FIG. 3(a), a conventional three phase thyristor bridge type rectifier 200 with a "floating" or "clamping" diode 212 is illustrated. Secondary transformer winding 204 provides an AC voltage to thyristors 206a, 206b which rectify first phase 202a. Similarly, secondary transformer winding 204 provides an AC voltage to thyristors 206c, 206d which rectify second phase 202b while secondary transformer winding 204 provides an AC voltage to thyristors 206e, 206f which rectify third phase 202c. In this manner, a rectified phase designated as 208 in FIG. 3(a) is provided across points 210a and 210b.

"Clamping" diode 212 is connected between (−) 218 and (+) 220 outputs of the bridge rectifier. Inductor 214 is connected in series with an ungrounded output cable between "clamping" diode 212 and arc furnace 12. Inductor 214 is used to supply transient voltage frequently required to maintain a stable arc 216 during operation of arc furnace 12. The function of "clamping" diode 212 is to provide a path for the current from inductor 214 to flow when the voltage of DC arc 216 exceeds the open circuit voltage of the rectifier.

Referring now to FIG. 3(b), another conventional circuit 230 to convert three phase AC power to DC power which is suitable for use in the present invention is shown. This type of circuit is suitable for use in sustaining a DC arc 216 in furnace 12 and is frequently utilized in DC arc welding systems. In the circuit shown in FIG. 3(b), saturable reactors 232a, 232b and 232c are connected in series with each of the three AC secondary transformer windings and the three phase diode rectifier bridge. The function of saturable reactors 232a, 232b and 232c is to vary the impedance of the AC current path between the transformer and the AC input to the diode rectifier, thereby providing a means to maintain the desired amount of DC current in arc 216 even though the arc voltage may be varying rather rapidly.

Secondary transformer winding 204 in circuit 230 shown in FIG. 3(b) may be wye or delta. If secondary winding 204 is wye, then the primary winding (not shown in FIG. 3(b)) must be delta or be wye with or without a neutral return.

A "clamping" diode is not necessary in the type of circuit shown in FIG. 3(b) because the diodes in the bridge rectifier provide this function. Inductor 214 is used to supply the transient arc voltage necessary in order to maintain a stable DC arc 216 in furnace 12.

It is important that either the thyristor type or saturable reactor type of rectifier have a sufficiently high open current DC voltage to normally exceed the DC arc voltage. It is also important that either type of power supply be capable of holding a preset magnitude of DC current while the arc voltage ranges from zero to at least 90% of normal open circuit rectifier voltage even if the arc voltage is varying rapidly.

If arc furnace 12 is powered with AC rather than DC power, then the saturable reactor type of circuit shown in FIG. 3(b) is preferred since it will provide a greater degree of arc stability than a conventional thyristor type of AC switch.

Contact with the arc and the specific gravity of metals present in waste material 26 results in the formation of three phases or layers in furnace 12: a metal layer, a slag layer and a gaseous layer. Arc furnace 12 operates in a temperature range of about 1400°–2000° C., and preferably in the range of about 1550°–1600° C. based on the composition of the waste feed. The arc plasma operates in a temperature range of about 3500°–4500° C.

Metal layer or phase 88 accumulates by gravimetric separation in the bottom of furnace hearth 12 until a sufficient quantity is collected. Metal 88 is then discharged into a separate container through discharge port 18. As mentioned above, port 18 may be formed of any suitable material which is capable of handling metal in a temperature range of about 1400°–2000° C. Port 18 may also include a flow control valve or the like to control discharge of metal 88 from furnace 12. Glass or slag 36 produced in arc furnace 12 passes under a weir into joule heated melter 32 which is coupled to furnace 12. While the operating temperature in joule heated melter 32 may vary depending on the composition and properties of the slag, melter 32 is preferably operated at approximately 1200°–1600° C.

The primary mode of operation in furnace 12 and melter 32 is pyrolysis. However, operation in a partial oxidation mode may be required to assist in the processing of large quantities of combustible materials.

As further illustrated in FIG. 1(a), system 10 also includes turbine 56, generator 60, and the necessary equipment required to couple the arc furnace-melter unit thereto. For example, system 10 preferably includes hot gas cleaning equipment 40, waste heat recovery unit 72, and air 48 and water 68 injection systems. While not shown in FIG. 1(a), a feed conditioning process for waste material 26 in feed system 20 may also be utilized prior to being fed to furnace 12. In addition to the units shown in FIG. 1(a), it may be desirable to incorporate an off-gas scrubbing process for gases exiting clean-up unit 40 or the gas fired turbine to remove any acid gases therefrom. Preferably, the only gas conditioning required for the gases exiting arc furnace 12 is gas-solid separation in hot gas clean-up unit 40 to minimize the amount of particulates entering turbine 56.

The gases produced in furnace 12 are combustible gases formed as a result of fast pyrolysis. As discussed herein, fast pyrolysis generally results in at least 65% conversion of waste material to a useful gas for combustion. Arc furnace 12 utilized in accordance with the present invention is thus expected to provide a gas containing about: 2% carbon dioxide, 44% carbon monoxide, 43% hydrogen, 2% methane and the balance being light hydrocarbons. The gas produced in furnace 12 is transported through line 30 to hot gas clean up unit 40 where ash 42 is removed and thus separated from fuel gas 44.

Intake air 48 enters compressor 46 and air 50 exiting compressor 46 may be divided into several delivery streams. For example, air flow 50a can be fed to combustor 52 and air flow 50b may be fed to furnace 12.

Fuel gas 44 enters combustor 52 and combines with air 50a. Hot gases and steam 54 produced in combustor 52 drive turbine 56 which is connected to generator 60 via 58 such that electricity 64 is thereby generated. Turbine 56 is preferably a high efficient steam-injected gas turbine. Such turbines are commercially available. To ensure self-powered operation, especially during startup, a varying amount of natural gas or other type of fuel 53 may be fed to combustor 52 (or internal combustion engine 55 as shown in FIG. 1(b)).

Water 68 enters system 10 through pump 66 to heat recovery steam system 72, i.e. a heat exchanger where heat from hot turbine exit gas 62 exchanges to flow 70. Exhaust 74 is separated from steam 76 in heat recovery steam system 72. Steam 76 is preferably recycled as steam 78 to turbine 56 and as steam 80 to air flow 50b, as shown in FIG. 1(a) respectively.

Figure 1B:
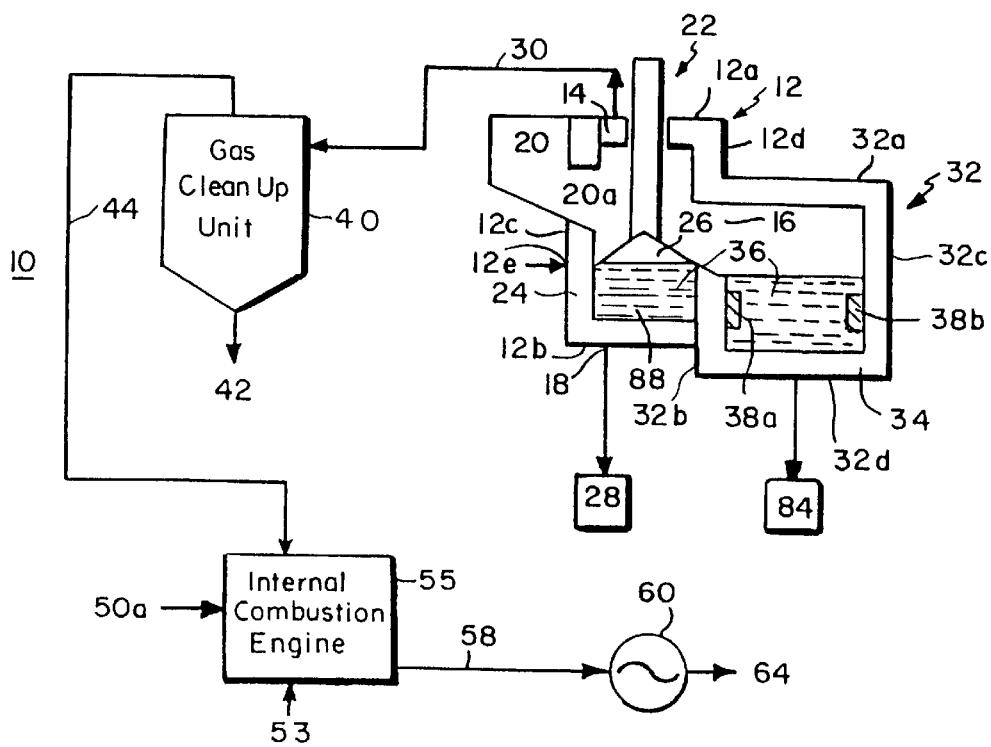
FIG. 1(b) is a schematic view of a flow diagram illustrating the process and apparatus suitable for use in arc alternative embodiment of the invention in which the combustor and gas turbine engine shown in FIG. 1(a) are replaced by a spark ignition or diesel internal combustion engine.
Figure 2A:
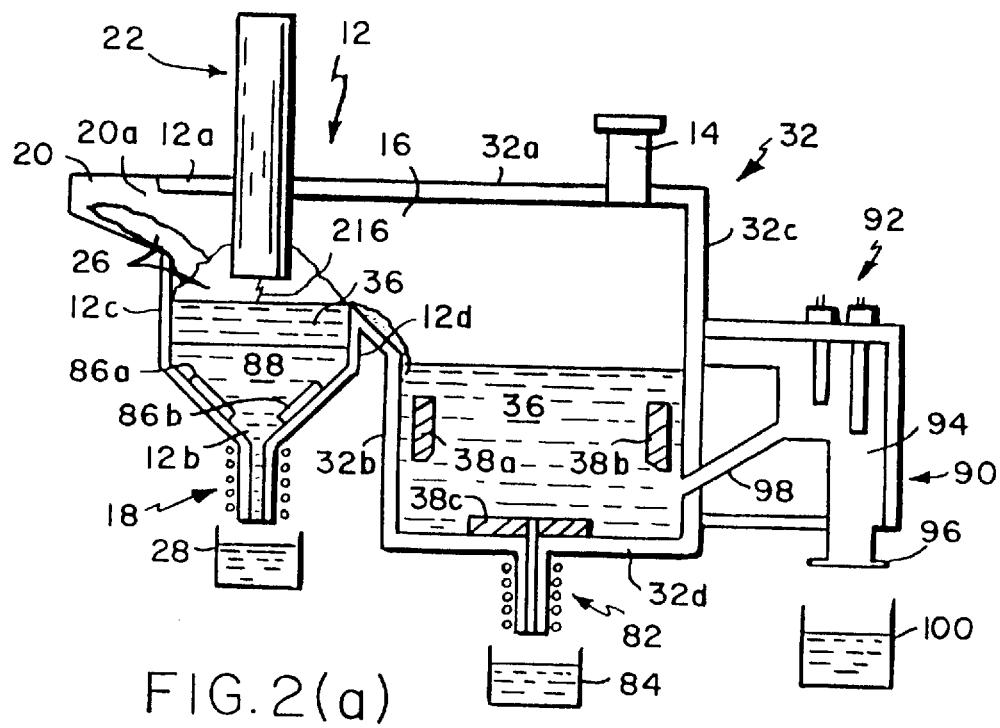
FIGS. 2(a)–2(e) illustrate a directly coupled arc plasma furnace and joule heated melter in accordance with the present invention.
Figure 2B:
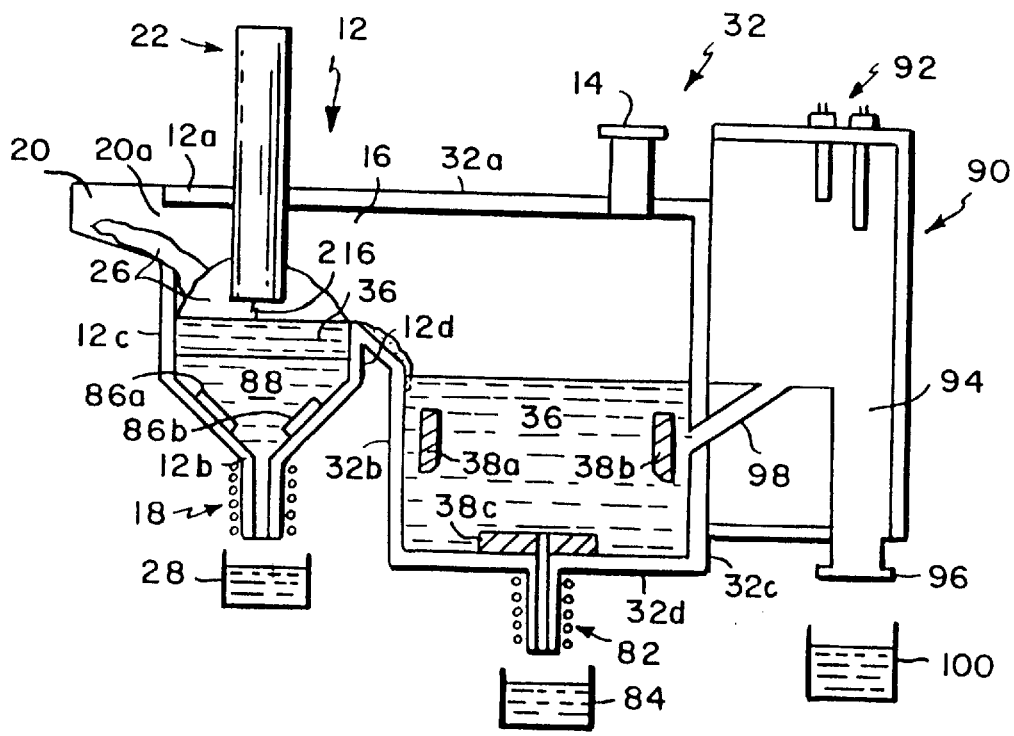
Figure 2C:
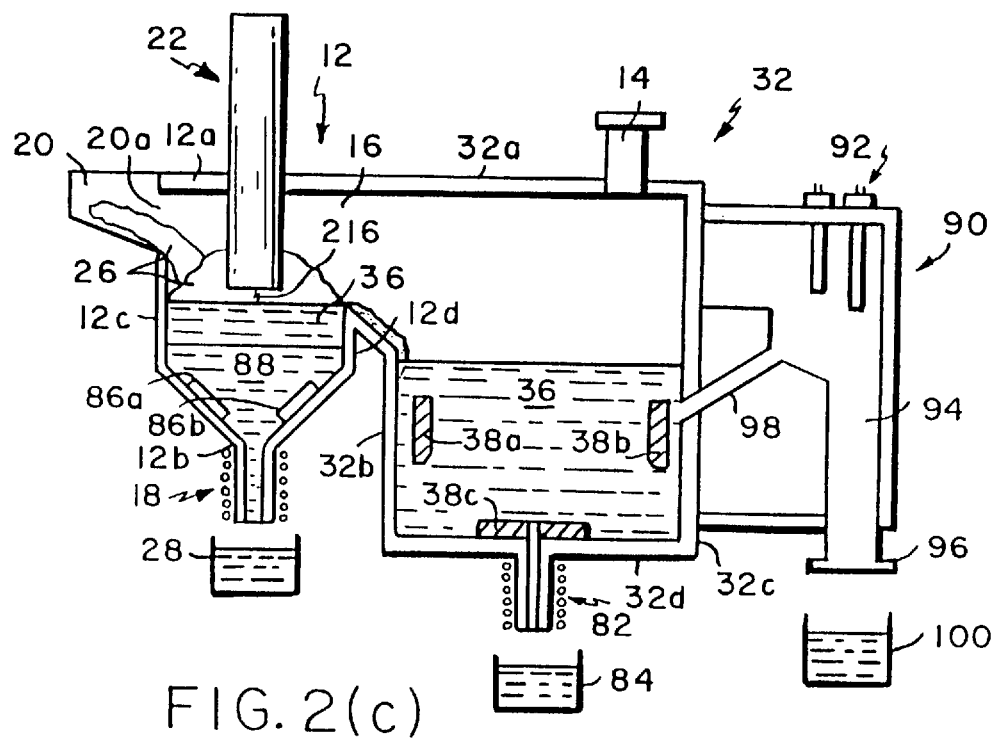
Figure 2D:
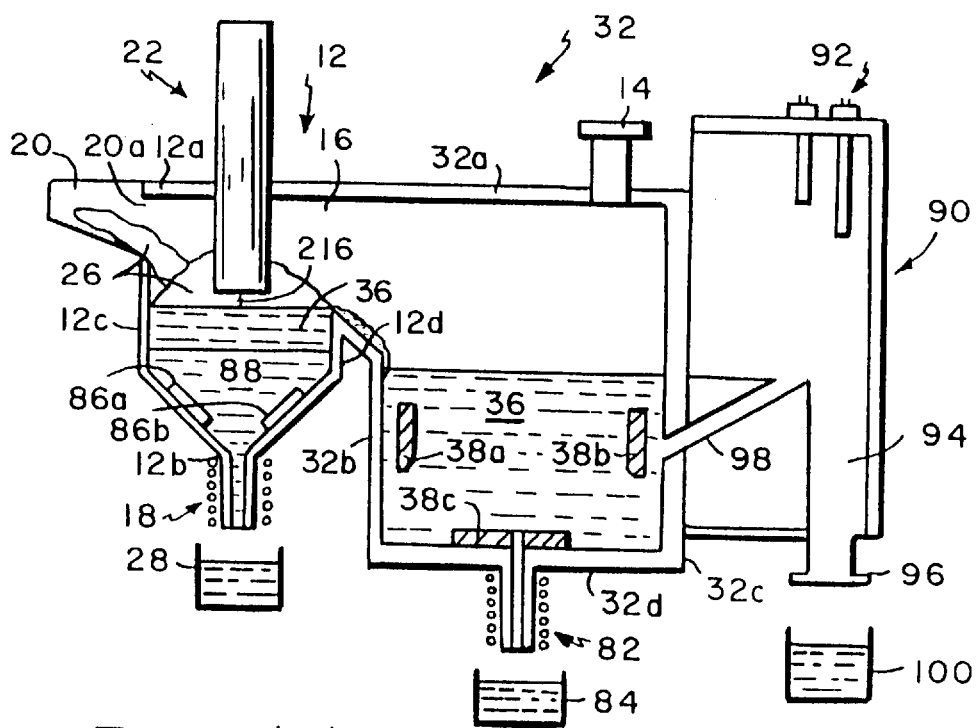
Figure 2E:
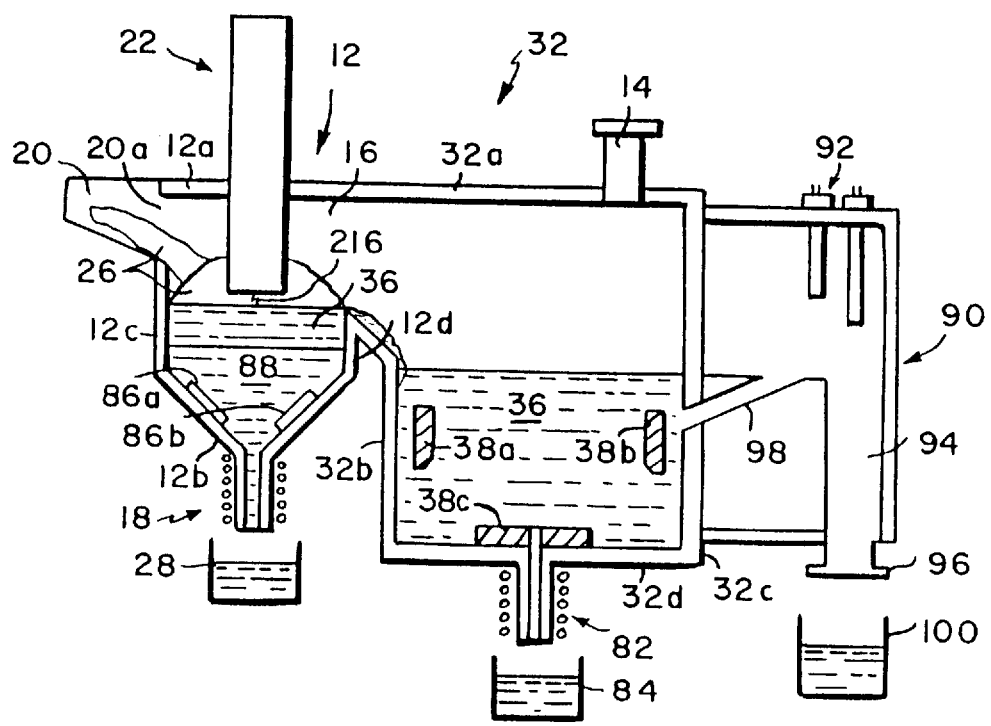

Referring now to FIG. 1(b), a process similar to that shown in FIG. 1(a) is illustrated except that compressor 46, combustor 52 and gas turbine 56 are replaced by an internal combustion engine 55. Internal combustion engine 55 may be easier to utilize and may be more cost efficient than a compressor-gas turbine, especially for small tunable plasma-melter electroconversion units. Air 50a and auxiliary fuel 53 may be fed to internal combustion engine 55 in a predetermined manner based on the composition of fuel gas 44. Preferably, the efficiency of engine 55 provides sufficient electricity for all or substantially all of the electrical power required for the tunable plasma-melter electroconversion unit.

While not intended to be limiting, internal combustion engine 55 is preferably operated in a very lean mode, i.e. a high ratio of air to fuel with hydrogen-carbon monoxide gas as fuel. In this manner, electricity may be produced from hydrogen-rich gas. By operating with low equivalence ratios (fuel/air ratios relative to stoichiometric ratios) in a range of about 0.5, production of $NO_x$ may be greatly reduced, i.e. by a factor of about 100 relative to stoichiometric operation. Hydrocarbon and carbon monoxide emissions should also be very low.

Spark ignition internal combustion engines can be advantageous in that such engines are less expensive for very small units and are easier to start and stop than turbines. To facilitate production of a desired level of electrical power, particularly during startup, an auxiliary power such as hydrogen-rich gas, propane, natural gas or diesel fuel may be used to power the internal combustion engine. The amount of auxiliary fuel may vary depending on the composition of the waste stream, i.e. the heating value of the incoming waste material and the amount of combustible material in the waste material and the power requirements for waste processing.

Alternative preferred embodiments of the invention are shown in FIGS. 4–8. In these embodiments, the DC arc and the AC joule heated electrical systems are fully integrated and operated simultaneously in a single glass melt, but are isolated electrically from one another through the use of a special power delivery circuit. The arc plasma-melter combinations illustrated in FIGS. 4(a)–(d) and 5 are thus integrated both thermally and electrically, while the arc plasma furnaces coupled to the joule heated melters illustrated in FIGS. 1(a), 1(b) and 2(a)–2(e) are thermally coupled in one direction, i.e. heat in the molten bath in the joule heated melter is not used to heat the molten bath that forms the major part of the current path in the arc plasma furnace.

The fully integrated plasma-melter systems in accordance with the present invention provide the advantage of having continuously tunable proportions of power between the plasma heating and the glass melter heating. For example, the continuously tunable independent powering is useful when it is desirable to utilize one portion of the system, e.g. the arc plasma or the melter. The continuously tunable independent powering provides robustness and facilitates ease of operation under changing conditions. The continuously tunable independent powering additionally improves efficiency and maximizes environmental attractiveness by providing additional control over solid waste products, e.g. glass and off gas generation.

Continuously tunable independent operation of the arc plasma and melter allows the user to select various types of heating. For example, the arc plasma (or plasmas) provides radiative surface heating. Large amounts of plasma power may be used at the initiation of feeding. Somewhat lower, but still substantial amounts of plasma power may be used during continuous feeding. High surface waste temperature heating facilitates high throughput processing as well as fast pyrolysis to produce high quality combustible gas. High surface heating is also needed for processing where the material is difficult to melt or where the material is highly conductive, thereby limiting the effectiveness of joule heating with glass in the absence of arc plasma.

Joule heating with glass melter electrodes provides deep, volumetric heating. This type of heating ensures production of high quality glass by promoting mixing in the entire melt pool. It also provides conductive material for more stable transfer arc operation. Independent use of volumetric heating may also be utilized to maintain the waste in a molten state at low power requirements when there is no feed. Volumetric heating is also important for glass pouring.

Continuously tunable independent powering of plasma heating and glass melter heating facilitates the use of extra volumetric heating for purposes of glass pouring or improved glass production without increasing the adverse effects of only plasma heating such as excessive volatilization of material and thermal stressing of the furnace wall.

In addition to continuously tunable independent powering during processing of a given type of waste stream, the tunable features of the integrated plasma melter units may be used to optimize processing of different types of waste streams. For example, municipal waste streams may generally require lower relative amounts of plasma power than would streams that have high melting temperature materials and larger amounts of metals such as hazardous and industrial wastes composed largely of inorganic substances.

The use of volumetric melter heating also facilitates a greater range of options for plasma electrode configurations. Because volumetric melter heating maintains material in a substantially molten and conductive state, more than one plasma electrode may readily be utilized. This is in part due to the molten material providing the conducting path between the electrodes. It is thus readily possible to continuously tune operation for the use of one or more plasma electrodes. The increased flexibility may be used to optimize production of combustible gas, minimize particulate emission and reduce electrode wear.

Continuously tunable independent powering of the plasma and melter heating systems thus provides a greatly expanded amount of temperature control. Spatial and temporal control of temperature which had not been previously available may be used to improve the practicality and environmental attractiveness of combined arc plasma and melter vitrification systems.

As discussed herein, the full integration of a joule heated melter with the arc plasma in accordance with the present invention also facilitates the use of an elongated melt chamber with two arc plasma electrodes. The molten material is capable of providing a conducting or current path between the two arc plasma electrodes. This configuration significantly increases flexibility of waste feed and slag tapping and increases arc plasma electrode life and robustness. The two arc plasma electrode elongated chamber arrangement is facilitated by the joule heated melter because the joule heated melter is capable of providing the necessary heat to maintain a conducting path between the two arc plasma electrodes during idle furnace periods and also provides uniform heating in the elongated melt chamber.

The embodiments of the invention shown in FIGS. 4–8 include a circuit arrangement which allows passage of the required AC power through the melt using submerged electrodes as in standard conventional joule heated melters, and which also allows simultaneous operation of a DC arc plasma circuit through the melt between upper movable electrodes or, if desired, between these electrodes and/or a submerged counter electrode. The type of waste and the character of the molten slag will determine the preferred operating mode.

The integrated arc plasma-melter unit 300 is shown in FIGS. 4(a)–4(d) and includes reaction vessel 302. It should be appreciated that the joule heated melter facilitates production of a high quality pyrolysis gas using the minimum energy input to the process. This situation exists because energy input to the arc does not need to be greater than that required to pryrolyze and melt the material in the arc zone. The molten bath below the uninelted feed material is maintained at desired temperature using joule heating as opposed to using only an arc plasma furnace. Air/oxygen and/or a combination of air and steam is added to eliminate char from the melt surface and adjust the redox state of the glass. The joule heated melter provides energy (i.e. hot glass) near the sides of the bath where the gas/steam mixture is introduced. Integrated unit 300 may also include auxiliary heater 320.

Reaction vessel 302 includes top 302a, bottom 302b, and sides 302c and 302d. Bottom 302b may have a generally V-shaped configuration as illustrated in FIGS. 4(a)–(d). Reaction vessel 302 further includes at least one port or opening 304a for introducing waste material 330 into reaction vessel 302. In a preferred embodiment, reaction vessel 302 includes a plurality of ports or openings 304a and 304b as shown in FIGS. 4(a)–4(d). Ports 304a and 304b may include a flow control valve or the like to control the flow of waste material 330 into vessel 302 and to prevent air from entering vessel 302 therethrough. It is also preferred that such ports 304a and 304b be capable of being controlled such that one or more can be selectively utilized separately or simultaneously with one or another. Reaction vessel 302 also includes gas port or opening 306 and metal/slag pouring port or opening 310. As discussed above with reference to FIG. 1(a), gas exiting from port 306 preferably will enter line 30 (as shown in FIGS. 1(a) and 1(b)) and will be sent to a scrubber, turbine or the like for further processing. Port 306 is provided with a flow control valve or the like so that gas formed in reaction vessel 302 may be selectively released into line 30. Metal/slag port 310 operates in a manner similar to that of port 28 shown in FIG. 1(a). In particular, port 310 is designed to have a flow control valve or the like so that metal and/or slag may be removed and introduced into metal/slag collector 312 at predetermined periods of time during the process. When hazardous waste is being processed, it may be desirable to have collector 312 sealably connected to port 310 in a manner such that air and/or gases do not enter or exit the system therethrough.

Chamber 320 functions similarly to auxiliary heater 90 shown in FIGS. 2(a)–2(e). In particular, due to differences in specific gravity, metal in metal/slag layer 332 moves toward bottom 302b in vessel 302. Slag in metal/slag layer 332 exits through opening or port 326a into conduit 326. It should be appreciated that conduit 326 may be positioned similar to any of the configurations as shown and described with reference to conduit 98 in FIGS. 2(a)–2(e). Slag 334 is heated further by heaters 322a and 322b for a time sufficient to provide a homogeneous slag product. Alternatively or in addition to heaters 322a and 322b, the temperature of slag 334 may be maintained by plasma torch 323 in order to enhance flow into the receptacle for certain viscous types of waste. Slag 334 then passes through slag pouring conduit 324 and port 328, thereby exiting chamber 320 into slag collector 336. When hazardous waste is being processed, it may be desirable to have collector 336 sealably connected to port 328 in a manner such that air and/or gases do not enter or exit the system therethrough.

Reaction vessel 302 also includes a plurality of AC joule heating electrodes 308a and 308b. As further shown in FIG. 4(a), electrodes 308a and 308b may be positioned across from one another on sides 302c and 302d, respectively. In addition, electrodes 308a–308b are positioned so as to be submerged in the slag 332 mix when the process is in use.

Figure 4A:
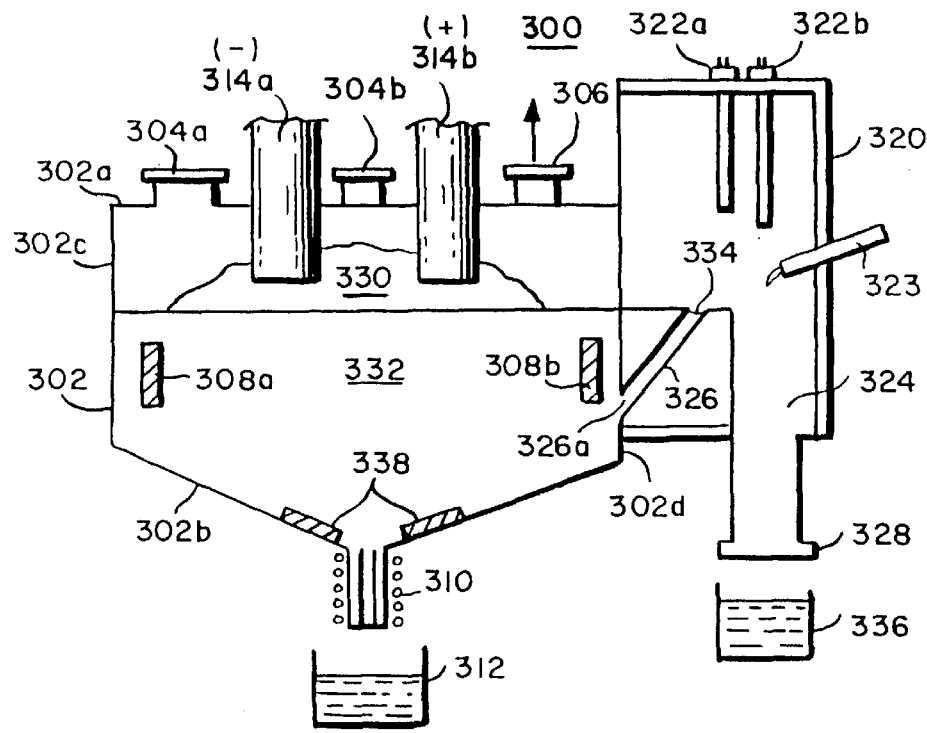
FIG. 4(a) shows an alternative and preferred embodiment of the arc plasma furnace and joule heated melter according to the present invention in which the furnace and melter are formed as a fully integrated system with a common molten bath.
Figure 4B:
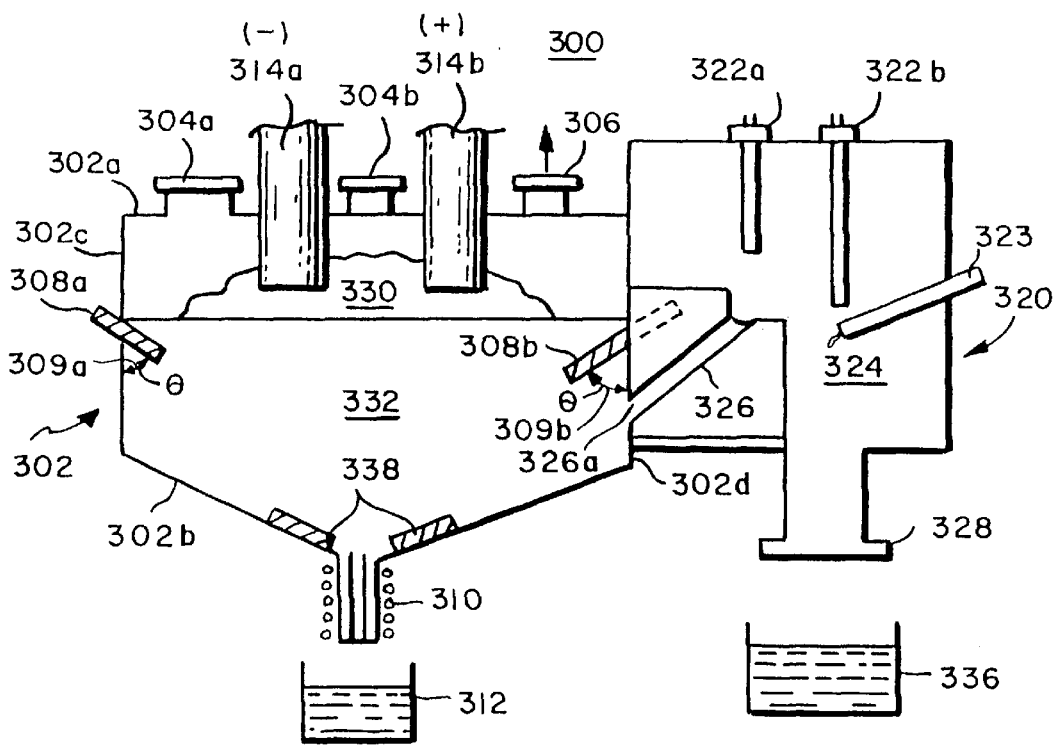
FIG. 4(b) shows a fully integrated arc plasma furnace and melter in which the melter portion electrodes are positioned at an angle relative to the vertical portion of the arc plasma-melter unit.

FIG. 4(b) illustrates an alternative arrangement for the positioning of electrodes 308a and 308b in accordance with the present invention. The positioning of electrodes 308a and 308b as illustrated in FIG. 4(b) facilitates replacement of the electrodes. In particular, this type of arrangement allows replacement of electrodes without the necessity of draining the furnace hearth. Draining the furnace hearth is undesirable as it often degrades the lining of the furnace. Accordingly, placing electrodes 308a and 308b at angles 309a and 309b respectively, while simultaneously preventing the escape or release of gas facilitates the replacement of electrodes as needed. While not to be construed as limiting, angles 309a and 309b of electrodes 308a and 308b relative to the respective interior sides of the furnace are preferably between about 30°–45°. It may also be desirable to utilize metallic electrodes or coated graphite electrodes for the joule heated melter. Electrodes 338 may be positioned at any angle so long as they are positioned on an interior face of the hearth. The arc plasma electrode or electrodes are preferably formed of graphite. The portion of the electrode length just above the bottom of the electrode may be coated to decrease the rate of erosion.

As further shown in FIG. 4(b), AC powered joule heating electrodes 308(a) and 308(b) are preferably inserted through sides 302c and 302d of furnace 302, respectively. As mentioned above, angles 309a and 309b of the electrodes relative to the respective interior sides of the furnace are preferably between about 30°–45°. The top end of each electrode preferably extends outside the metallic furnace enclosure and may be capped with an electrical connection which will be electrically insulated from the electrically grounded furnace shell. The bottom end of each electrode is immersed beneath the molten bath to a desired depth. By selecting the proper location of the point of entry of the electrode below the surface of the melt, no portion of the electrode will be exposed to the DC arc or radiation from this arc, thereby increasing the life of this electrode.

When it is necessary to replace electrode 308a and/or 308b, the spent electrode is withdrawn from the molten bath. If a new electrode is inserted into the bath without preheating the electrode, the cold electrode may cause the viscosity of the molten bath to increase where the electrode contacts the molten bath, thereby making it difficult to insert this new electrode into the molten bath. Accordingly, it may be desirable to also electrically energize this electrode by using a special electrically isolated, current limited power supply which will safely provide additional heat at the junction of the bath and the electrode to fully permit immersing the new electrode into the bath. In a preferred embodiment, suitable electrical and thermal insulation may also be provided to each electrode so that each electrode will be insulated both thermally and electrically from the metallic furnace enclosure during normal operation.

Figure 4C:
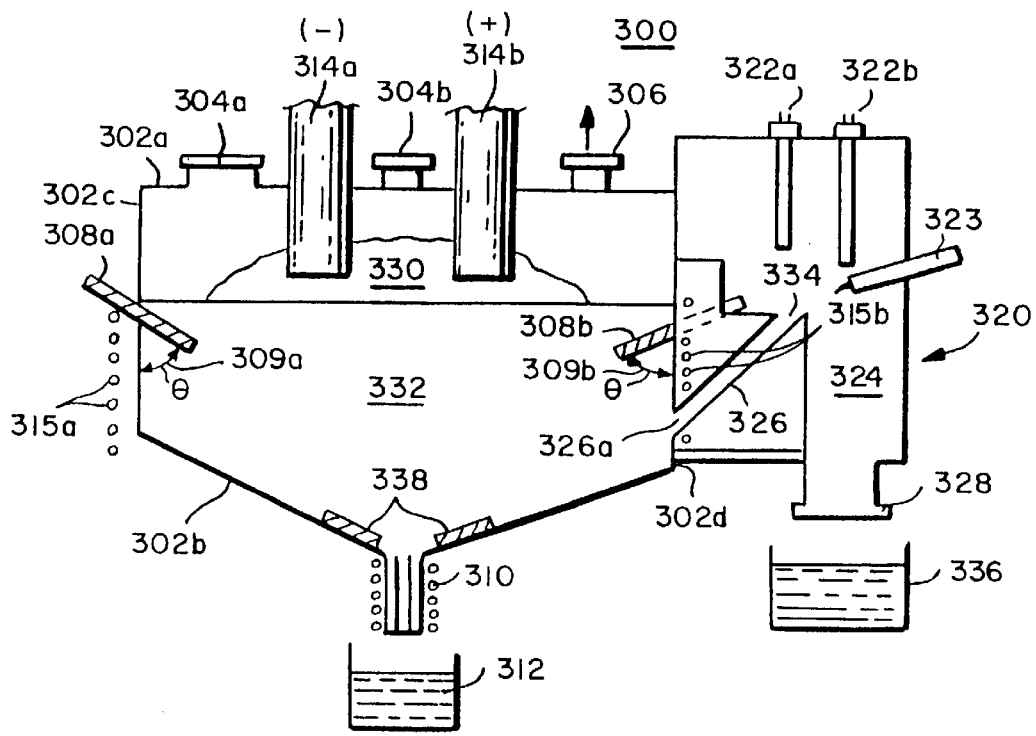
FIG. 4(c) shows the fully integrated system of FIG. 4(b) with magnetic coils for inductive heating and mixing in accordance with the present invention.

FIG. 4(c) illustrates another embodiment of the present invention in which magnetic coils 315a and 315b may be utilized for inductive heating and/or mixing. In order to provide the optimum rate of melting commensurate with the particular waste stream being introduced into the combined DC arc plasma-melter, additional stirring or mixing beyond that normally produced by the melter portion of the furnace and the DC arc portion of the furnace may be desirable. This may be accomplished by the addition of strategically placed magnetic coils such as coils 315a and 315b to create greater J×B forces which in turn causes additional mixing and/or heating in the molten bath. Coils 315a and 315b may be positioned within the metal shell of the furnace, but behind the refractory lining of the melt pool. Alternatively, if the furnace shell is fabricated of non-magnetic stainless steel such as 304L or 316 grade, the coils may be placed on the exterior of the shell. Coils 315a and 315b are connected to an AC power supply source. The frequency of the power supply source may vary depending on the material. This enhancement of bath mixing is an example of the type of "tuning" which may increase furnace electrode life and waste throughput.

The same features of tunability of the mix of the surface and volume heating that apply to the use of a joule heated melter apply to the use of the inductively heated melter in conjunction with the plasma. In a preferred embodiment, inductive heating capabilities are provided with the arc plasma-joule heated melter system as shown in FIG. 4(c). For some types of waste processing, it may be desirable to operate with only arc plasma and inductive heating. A representative system of this embodiment would be the same as that illustrated in FIG. 4(c) without joule heating electrodes. It should be appreciated that magnetic coils may also be utilized for inductive heating and/or mixing in conjunction with the arc plasma-melter combinations illustrated in FIGS. 1(a) and 1(b). In these embodiments, the arc plasma furnace and the joule heated melter are each provided with coils. In this manner, the coils used with the arc plasma furnace may be operated and controlled independent of the coils used in connection with the joule heated matter.

Figure 4D:
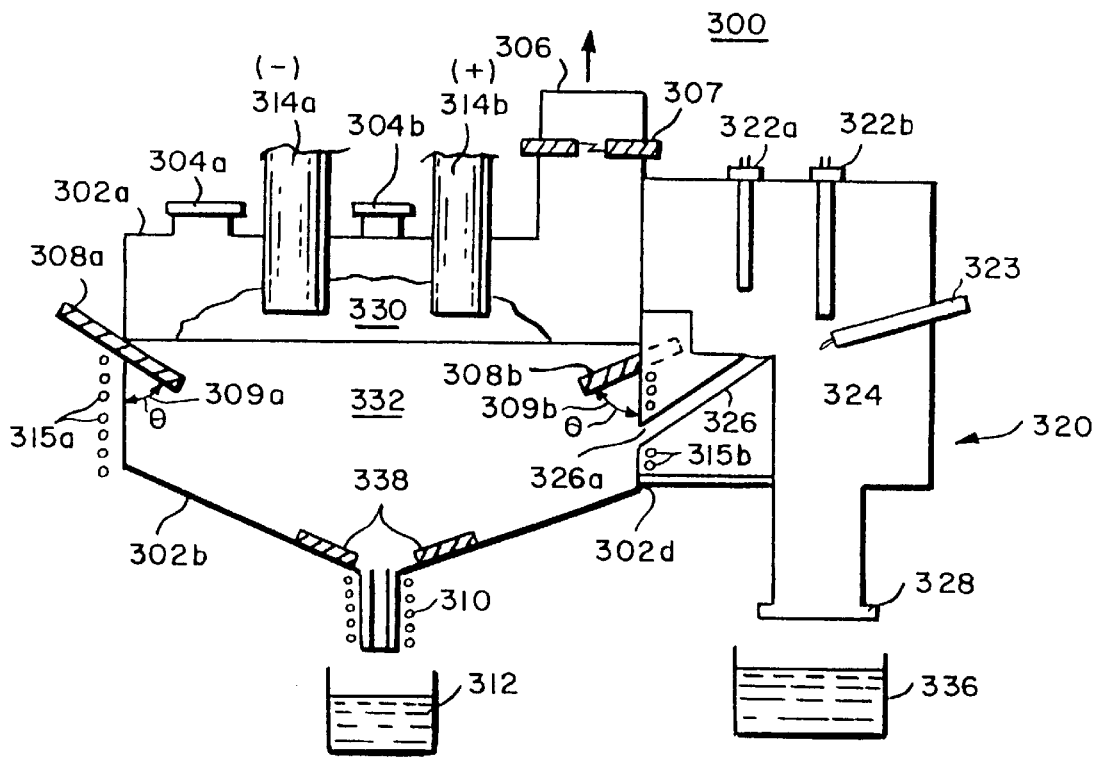
FIG. 4(d) illustrates the fully integrated system of FIG. 4(c) having a secondary thermal boost in accordance with an alternative embodiment of the invention.

FIG. 4(d) illustrates another embodiment of the present invention in which an alternative configuration of the plasma melter process incorporates a secondary thermal boost system 307. This system may be an arc plasma in a chamber to provide the necessary thermal energy to further crack condensable fractions exiting the primary plasma-melter process. As shown in FIG. 4(*d*) for example, secondary thermal boost system 307 may be placed proximate to or within port 306.

Conversion of waste to electrical energy for the plasma melter process depends on maximum conversion of solid and liquid wastes to gaseous product gas. In pyrolysis processes, a portion of the exiting gas may contain condensables that are light to medium weight oils. If the gas exiting the primary plasma-melter chamber is allowed to cool, liquefaction of a portion of the off-gas may result due to the condensables present at furnace temperatures. The secondary plasma off-gas chamber ensures that these oils are converted to noncondensible combustible gases resulting in an enhanced recovery of energy value from the incoming waste materials.

When secondary plasma chamber 307 is positioned as shown in FIG. 4(*d*), the gas exiting the primary furnace chamber does not decrease in temperature before entering the secondary plasma chamber 307 because the two systems are directly coupled. This minimizes the overall energy requirements for the cracking and gasification processes.

In addition to enhanced energy recovery in the gaseous effluent of the arc plasma melter process, the plasma off-gas chamber 307 further eliminates toxic species that are not destroyed in the primary furnace chamber. This enhances the effectiveness of the process to destroy all precursor species such as the formation of furans and dioxins. Additionally, when treating volatile and semi-volatile toxic organics, the secondary plasma chamber can effectively destroy all toxic species. Because all condensable species exiting the furnace are converted to a combustible gas in the secondary plasma chamber, secondary waste generation is minimized. It should be appreciated that the plasma off-gas chamber may not always be required, but may be independently controlled during the process.

Figure 5:
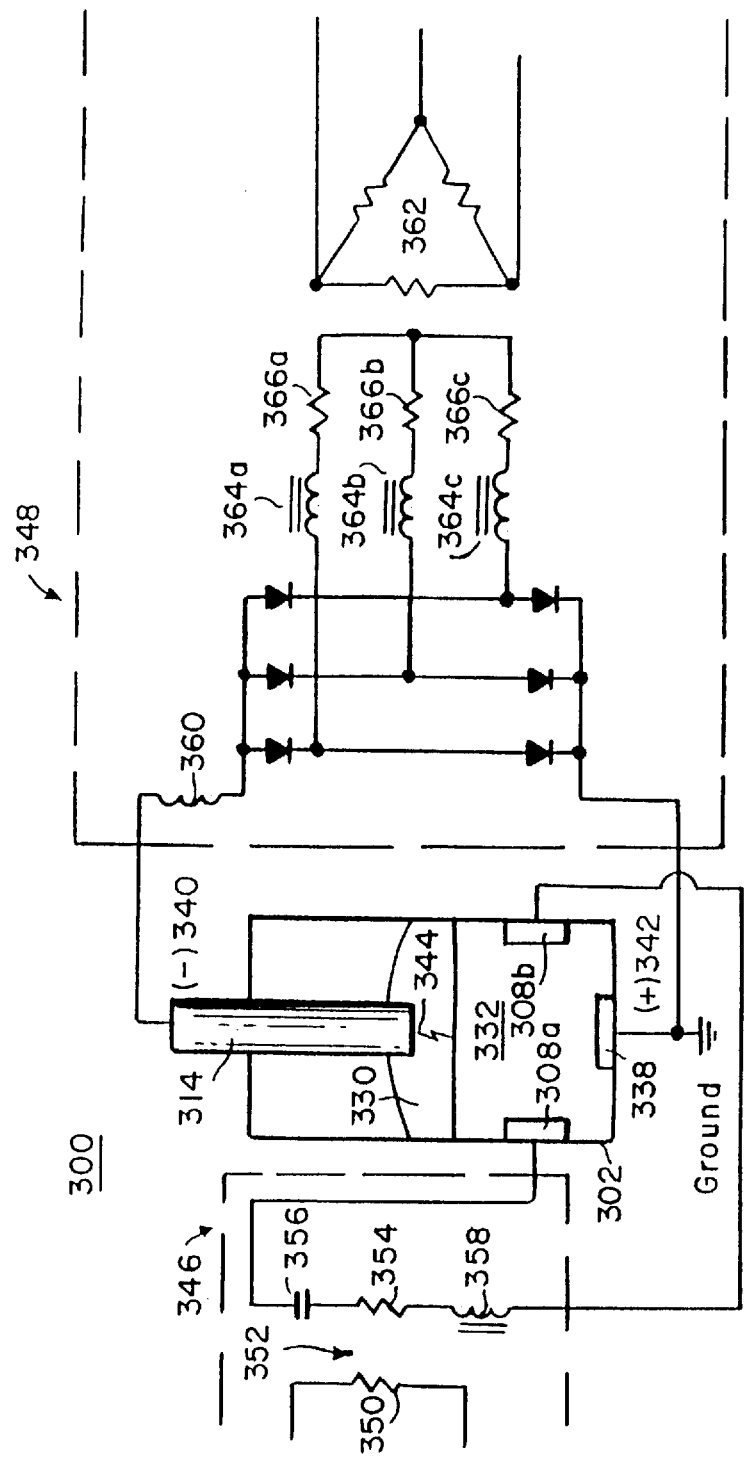
FIG. 5 illustrates a fully integrated arc plasma furnace and joule heated melter system with independently controllable power delivery systems.

DC electrodes 314*a* and 314*b* are provided within reaction vessel as shown in FIGS. 4(*a*)–4(*d*). As shown in FIG. 5, electrodes 314*a* and 314*b* supply arc 344 which contacts feed material 330. One or more additional electrodes 338 may be provided as shown in FIGS. 4 or 5 such that negative (−) 340 and positive (+) 342 outputs are formed thereby.

Electrode or electrodes 314*a* and 314*b* are preferably positioned in the furnace 302 at a sufficient distance from the walls 302*a*–302*d* such that feed material 330 can shield or protect the walls from thermal radiation. This facilitates the use of materials such as fused chrome alumina spinel, zircon, alumina-zirconia-silica and combinations thereof as refractory materials.

One configuration of integrated system 300 involves the use of capacitors 356 and a specific arrangement in the distribution of power. As shown in FIG. 5, a single phase joule heated arc plasma-melter 302 having a single pair of electrodes 314 and 338 for arc 344 is illustrated. Preferably, the joule heated portion of melter 302 utilizes AC power supply 346 while the arc portion of melter 302 utilizes DC power supply 348.

Melter 302 shown in FIGS. 4(*a*)–4(*d*) and 5 may also include refractory linings such as refractory linings 24 and 34 as discussed above. The refractory may be formed of any suitable material capable of handling temperatures in excess of about 1400° C. The refractory may be formed of ceramic or graphite. The refractory may also be formed of high durability refractory materials such as fused chrome alumina spinel, zircon, alumina-zirconia-silica and combinations thereof. It will be appreciated that other durable refractory materials are suitable for use in the invention. These materials can also be thermally shock sensitive.

The embodiment shown in FIG. 5 utilizes the combination of the DC and AC power systems 348, 346 respectively, supplying power to electrodes in the single vessel or melter tank 302 in which waste material 330 is undergoing treatment by a conversion process, including vitrification. A special circuit is necessary because DC arc current 314, 338 will interact with joule heating AC electrodes 308*a*, 308*b* unless special steps are taken to prevent such interaction. As discussed herein, such interaction can cause a failure of the transformers which provide power to the joule heating electrodes. This circuit allows fully independent control of the arc plasma and joule heated melter.

If single-phase, two-phase, or three-phase AC arcing electrodes are utilized instead of DC arcing electrodes, there may still be interaction between the AC arc circuit and the joule heating AC circuit. While the AC—AC interaction is quite complex, there are many dependent interactions which can occur, and under these circumstances, it is often difficult to control localized heating and electrode erosion. Accordingly, it is preferred to utilize a DC arc circuit in combination with a joule heated AC circuit.

DC power supply 348 includes inductor 360, primary winding 362, secondary windings 366*a*, 366*b* and 366*c* and saturable reactors 364*a*, 364*b* and 364*c*. Primary winding 362 is preferably delta. Saturable reactors 364*a*, 364*b* and 364*c* are connected in series respectively with secondary windings 366*a*, 366*b* and 366*c*.

If DC current 348 passes through waste material 330 and slag/metal melt pool 332 having submerged joule heating AC electrodes 308*a*, 308*b* connected directly to the terminals of transformer 352 with no means of blocking the flow of DC current 348 through the windings of transformer 352, the core of transformer 352 saturates. This results in increased current in primary winding 350 of transformer 352 causing transformer 352 to fail in a very short time period. In order to simultaneously operate the arc plasma and the joule heated melter in vessel 302, it therefore is necessary to continue to pass AC current 346 through melt pool 332 for joule heating, while simultaneously blocking DC current flow 348. Capacitor 356 is utilized to block DC current 348 and pass AC current 346. Capacitor 356 preferably is connected in series with each transformer secondary winding 354 in order to balance the current in each of the phases over a wide range of furnace operating conditions. As further shown in FIG. 5, capacitor 356 is connected to secondary winding 354, which is connected to saturable reactor 358.

FIGS. 6(*a*) and 6(*b*) show a circuit arrangement which is suitable for use in the present invention. In particular, three phase AC power supply 346 is illustrated in FIG. 6(*a*) while DC power supply 348 is illustrated in FIG. 6(*b*). The circuit includes the inductance of each AC current path in vessel or melter 302 as reflected through the entire AC power system 346, the non-linear resistance of the current path through melt pool or molten bath 332, the electrode interfaces, the power feed cables, and secondary windings 372*a*, 372*b* and 372*c* of transformer 376 and the magnitude of the capacitance of capacitors 370*a*, 370*b* and 370*c* which is connected as a series element in the joule heating furnace circuit. AC power 346 also includes primary winding 350, saturable reactors 374*a*, 374*b* and 374*c* and electrodes 368*a*–368*f*. Saturable reactors 374*a*–374*c* are connected respectively to secondary windings 372*a*–372*c*.

Because the AC current is rarely sinusoidal in a circuit having in series with a non-linear resistor such as the joule heating furnace circuit, it is possible to excite several harmonic frequencies other than 60 Hertz, which are superimposed on the 60 Hertz sine wave supplied by the utility company. In this circuit, it is important to account for the non-linear resistance and to specify the electrical components to achieve adequate damping and therefore stable operation. It is also important that the voltage, current, and capacitance ratings of the capacitor are such that the series resonant frequency of the entire system inductance at the furnace electrodes is such that the lowest value of resistance as seen at these same electrodes when looking into the furnace plus the effective 60 Hertz resistance is equal to or greater than 1.5 and preferably 2 times greater than the $(L/C)^{1/2}$ where L is the total inductance of the power system and C is the capacitance of capacitors 370a, 370b and 370c. The total effective resistance R should be 2 times $(L/C)^{1/2}$, but any resonant rise in current is negligible if this is 1.5 times $(L/C)^{1/2}$.

Figure 6A:
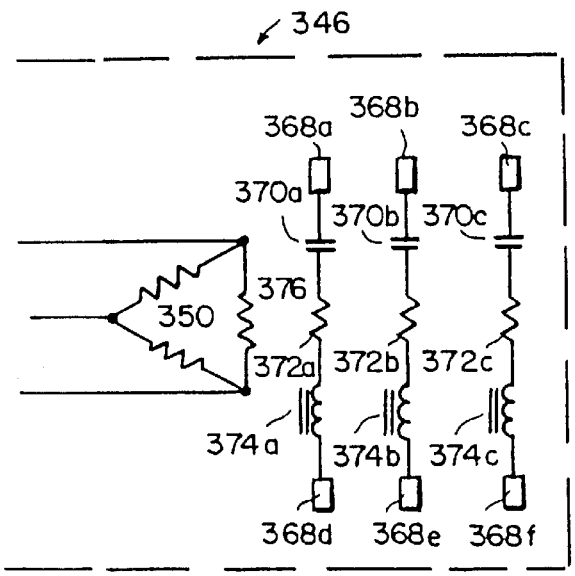
FIGS. 6(a) and 6(b) respectively show an AC power system and a DC power system for use with the fully integrated system shown in FIG. 5.
Figure 6B:
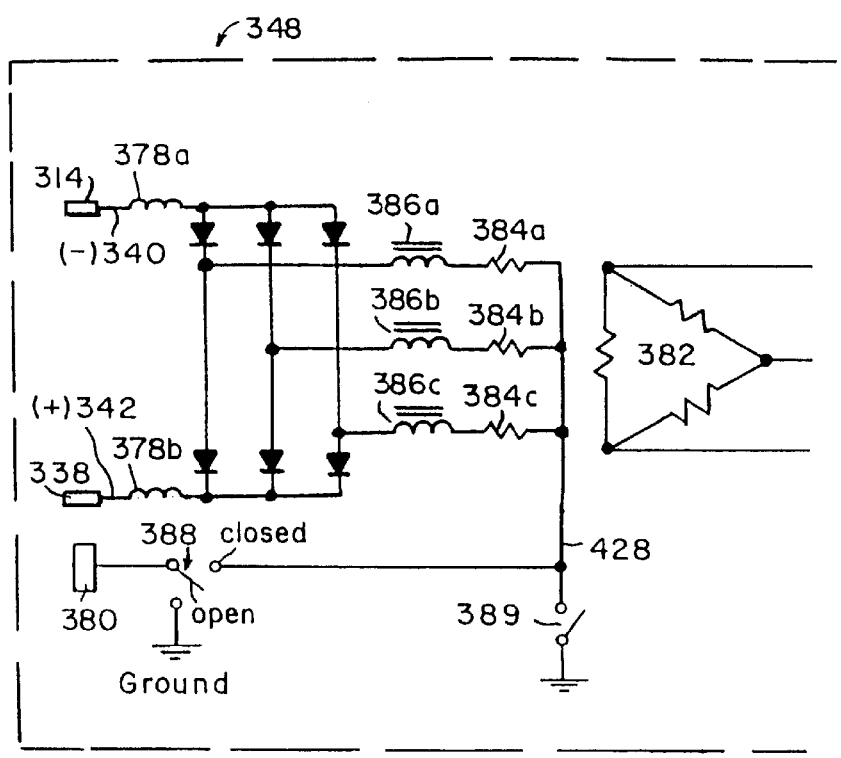

As shown in FIG. 6(b), DC electrical system 348 may have a power transformer with wye or delta secondary windings 384a–384c. Primary winding 382 is preferably delta. As also shown in FIG. 6(b), the power rectifier is preferably a three-phase full wave rectifier. The rectifier may be a current controlled thyristor rectifier as shown in FIG. 3(a), i.e. a silicon-controlled rectifier in which the anode-cathode current is controlled by a signal applied to a third electrode. Alternatively, the rectifier may be a three-phase full wave diode rectifier with the DC current control to maintain the desired DC current such as that illustrated in FIG. 3(b). If a thyristor rectifier is utilized, it is important that a full-rated current floating diode be placed across the thyristor rectifier and ahead of reactors 378a, 378b. In this embodiment, saturable reactors 386a–386c would not be used. It is not necessary to add a DC "floating" or "clamping" diode when using a three-phase rectifier since the diodes in the rectifier will suffice.

For a DC arc furnace, it is preferable to use a three-phase full wave diode rectifier with saturable reactor control 386a–386c. Regardless of which type of power supply is used, it is important that an inductor is connected in series with the DC power lead which is not grounded. This reactor is necessary to rapidly supply the energy when the furnace conditions are such that the DC arc voltage suddenly increases.

If the bottom of the inside of furnace or melter 302 is made of suitable refractory such as ceramic or the like and is a poor electrical conductor when hot, counter electrode 380 may be formed by depressing a portion of the floor of furnace 302 between joule heating electrodes 368a–368f and then slightly elevating the molten metal drain tube so that a pool of metal remains in this depression in the furnace floor even after the metal is drained. This metal may act as a counter electrode 380 for the AC joule heating circuit and may simultaneously be used as a DC arc circuit electrode.

Metallic furnace bottom electrode 380 may be connected using various configurations such as that shown by the circuit diagrams in FIG. 6(b). In any case, it is preferred to have one or more electrodes through the bottom of the furnace or melter. The electrodes may be graphite or metal. It should be noted that the circuits in FIG. 6(b) and FIG. 8 respectively include switches 388 and 436 in series with the electrical connection to electrodes 380 and 426, respectively. The function of these switches is to permit the DC arc or arcs to operate in either the transfer or non-transfer mode or a combination of both modes simultaneously. When a switch is "open" for example, there will be an arc from the (+) electrode to the bath and an arc from the bath to the (−) electrode. When a switch is "closed", there will be an arc from the (+) electrode to the bath and then to the counter electrode, and there will be current from the counter electrode through the bath and then by way of an arc to the (−) electrode.

Switch 388 is a three position switch, having closed, open and ground positions. Transformer neutral grounding switch 388 will permit several modes of operation. When unit 302 is operated in a mode in which the two DC arcs are electrically connected in series through molten bath 332, switch 388 will be in the "ground" position and single throw ground switch 389 will be "open". When unit 302 is operated in the mode where two DC arc electrodes operate independently, then switch 388 is in the "closed" position and single position switch 389 will be in the "ground" position. The "open" position of switch 388 may be used during system maintenance (or when joule heating is used without arc plasma heating).

If the physical configuration of furnace 302 (shown in FIGS. 4–5) is suitable for the use of two independently positioned controllable electrodes, then the DC arc electrodes and the AC joule heating electrodes may be operated simultaneously without detrimental electrical interaction. In addition, beneficial interaction for vitrification of all types of waste, including hazardous wastes and hospital waste can be obtained.

Figure 7A:
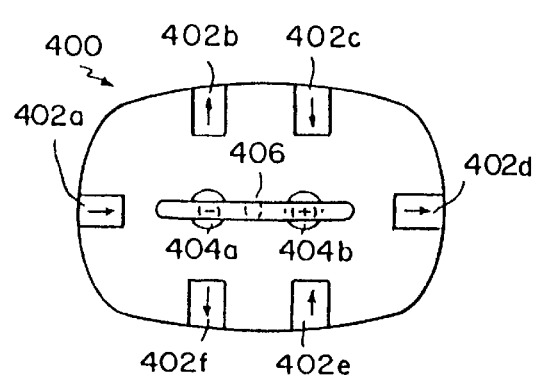
FIGS. 7(a)–7(d) show plan views for electrode configurations and geometries for use in accordance with the present invention.
Figure 7B:
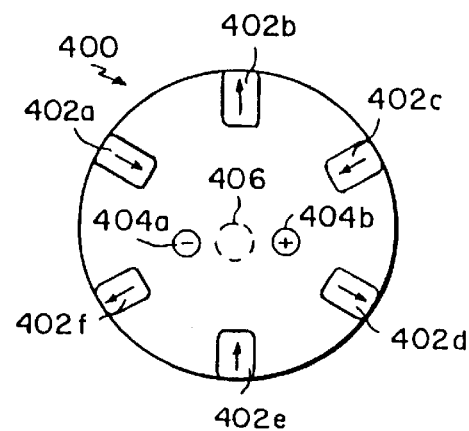
Figure 7C:
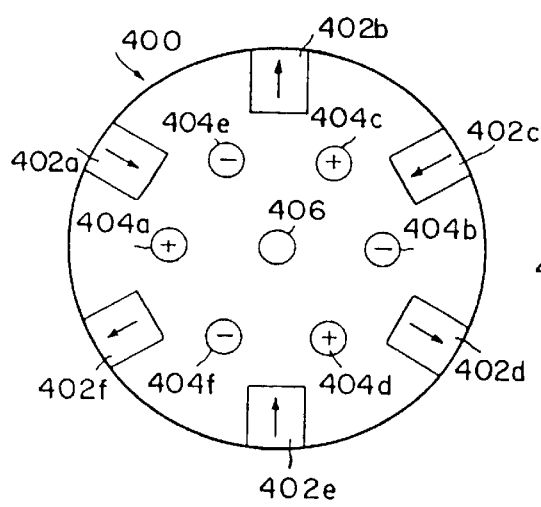
Figure 7D:
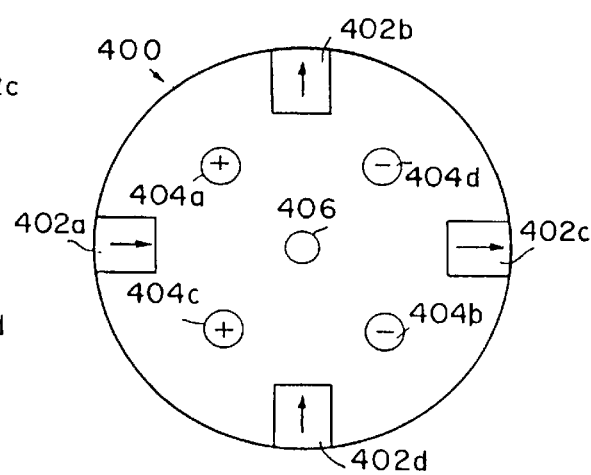

Exemplary plan views for various electrode configurations (and relative direction of current flow) suitable for use in unit 302 are shown in FIGS. 7(a)–7(d). These configurations are suitable for remote control of installations. FIG. 7(a) shows an elongated furnace construction while FIGS. 7(b)–7(d) show round furnace constructions. While both configurations can use one or more solid graphite electrodes, it may be preferred to use the elongated configuration with two electrodes (as shown in FIG. 7(a)) in some circumstances since this design lends itself to two separate small diameter electrode elevating systems, each housed in a metallic gas tight enclosure. In smaller furnaces, configurations such as that shown in FIG. 7(a) may be preferred over FIG. 7(b).

Any or all of the joule heating electrodes (402a, 402e or 402c) or (402d, 402b or 402f) can be connected as counter electrode 406 for the DC arc system. The electrode configuration illustrated in FIG. 7(b) utilizes one three-phase AC joule heating power supply and one DC rectifier power supply. In an alternative embodiment, shown in FIG. 7(c), six joule heating electrodes 402a–402f are employed with six arc electrodes 404a–404f. The configuration shown in FIG. 7(c) uses one three-phase AC joule heating power supply and three DC rectifier power supplies.

In another embodiment illustrated in FIG. 7(d), four joule heating electrodes 402a–402d are utilized with four arc electrodes 404a–404d. In this arrangement, two two-phase Scott T AC power and rectifier supplies are employed.

Figure 8:
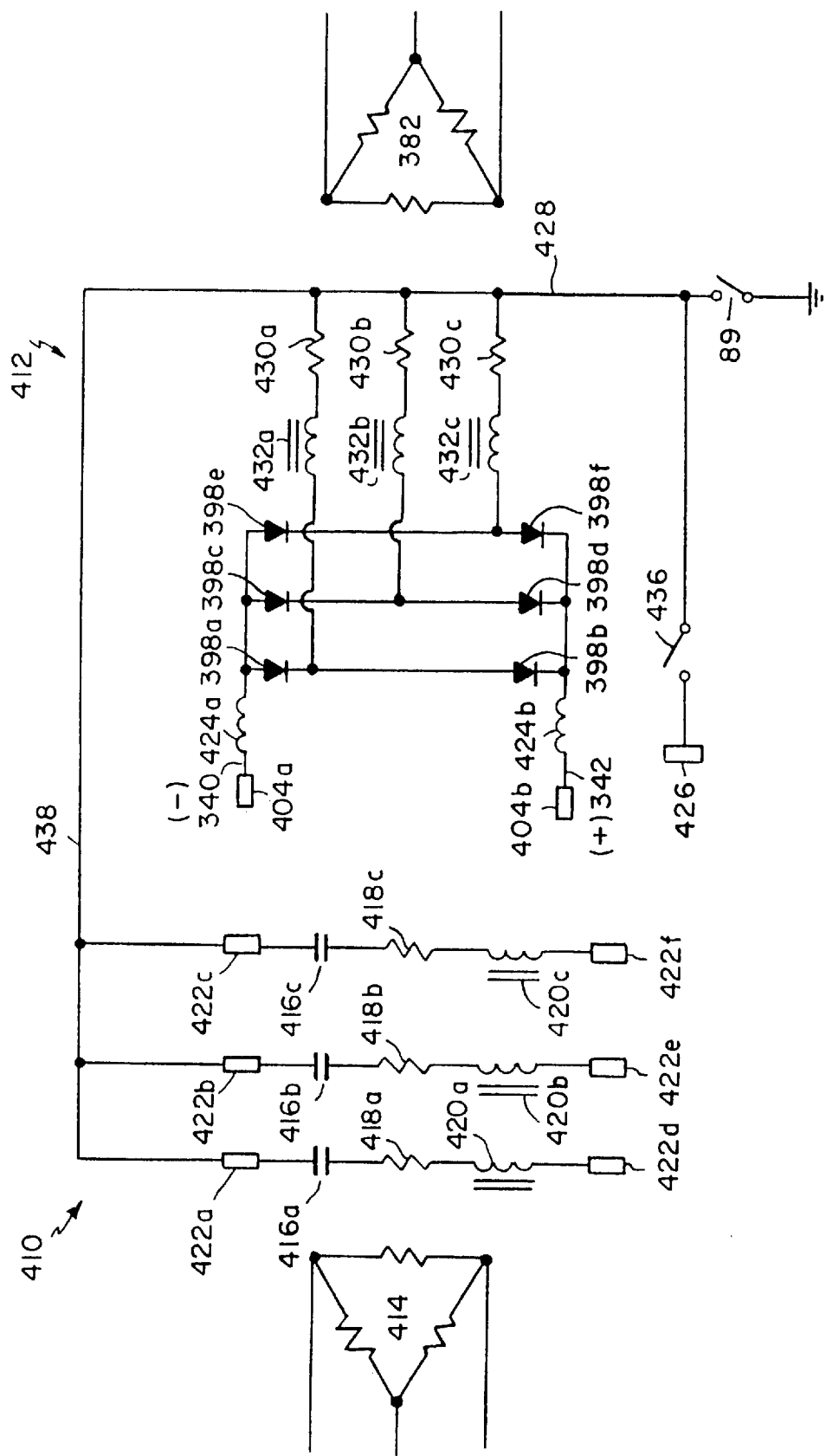
FIG. 8 illustrates a circuit diagram having the ability to connect a portion of the AC electrodes that will conduct both AC and DC according to the present invention.
Figure 9:
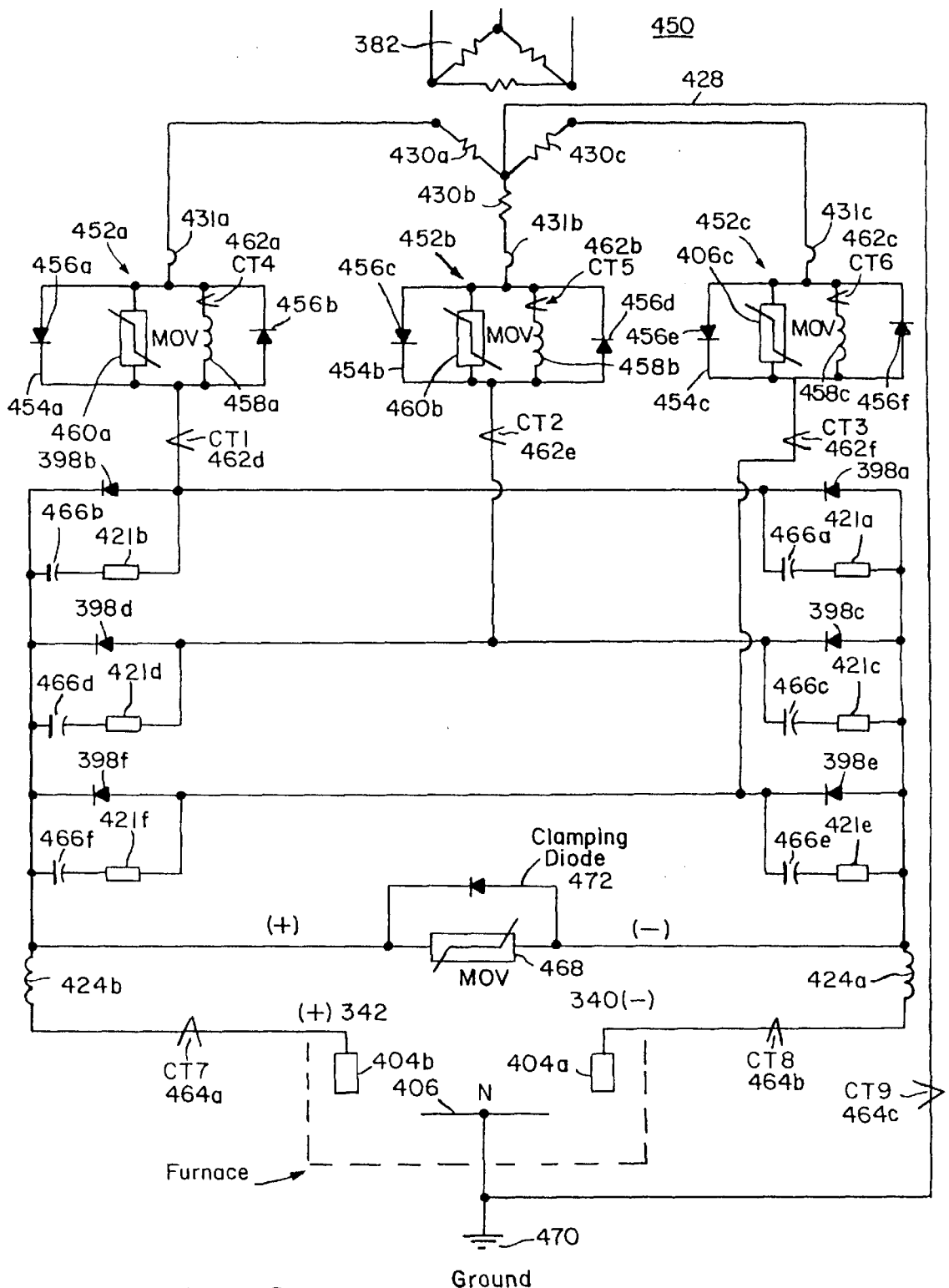
FIG. 9 illustrates an alternative circuit diagram suitable for use in the present invention.
Figure 10:
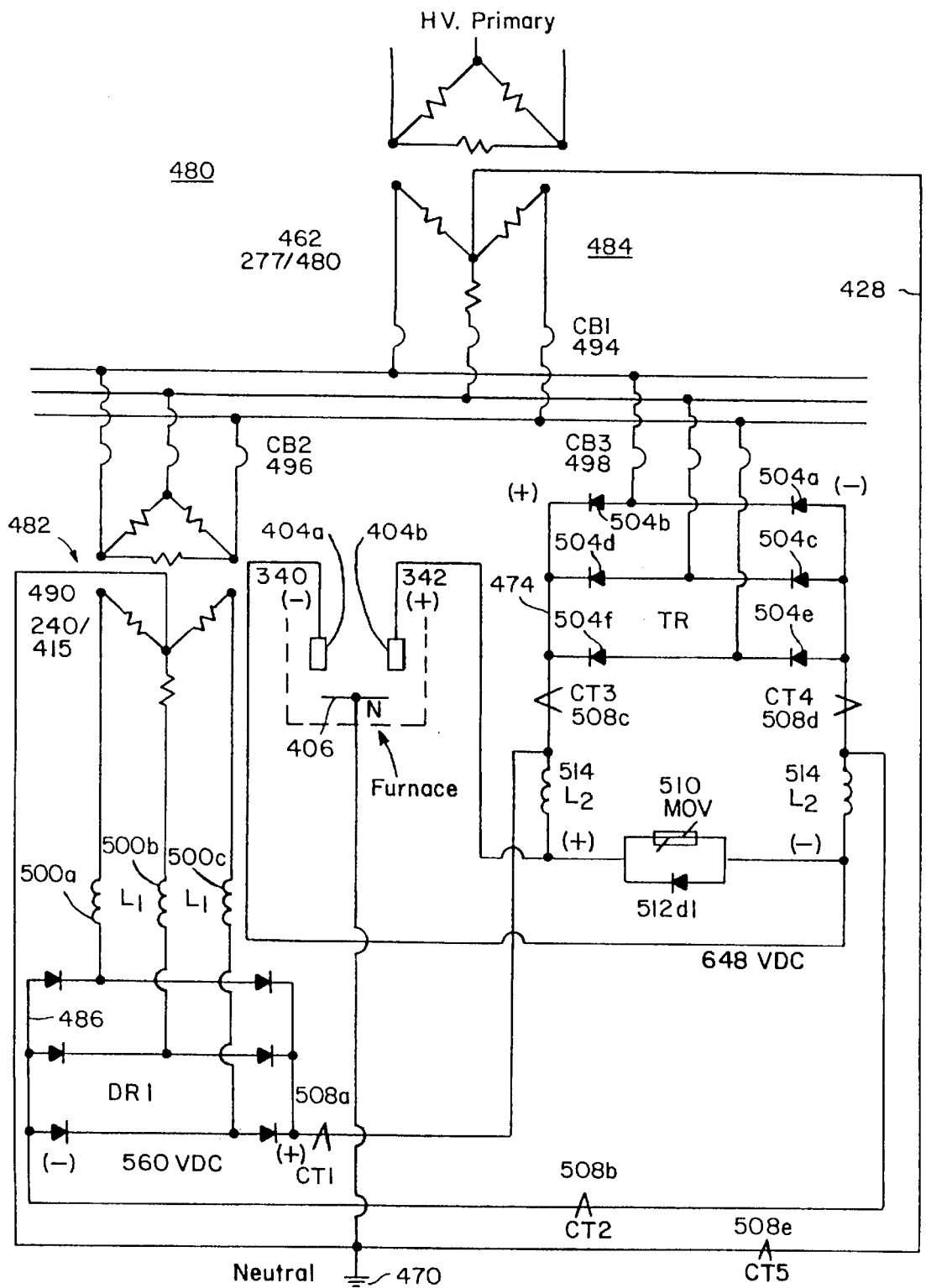
FIG. 10 illustrates another alternative circuit diagram suitable for use in the present invention.

As shown in FIG. 8, AC power supply system 410 includes primary winding 414, secondary windings 418a–418c connected respectively to saturable reactors 420a–420c (or thyristor switches as shown in FIGS. 9 and 10). DC power supply 412 includes inductors 424a, 424b and secondary windings 430a–430c connected respectively to saturable reactors 432a–432c. Depending upon the type of waste material being processed, it may be desirable to connect DC power supply 412 system neutral 428 to AC joule heating electrode 422a, 422b and 422c, which are the electrodes connected to AC capacitors 416a–416c respectively and which are used to block DC current flow through the secondary windings 418a–418c of the transformers as also shown in FIG. 8. The connection of DC power supply 412 and AC power supply 410 is designated in FIG. 8 as line 438. The reason for using this connection is to provide three additional DC counter electrodes closer to the surface of melt pool 332 during warm up of the furnace so that neutral DC transfer current 428 can flow and assist in stabilizing the positive (+) and negative (−) DC arcs before the material directly above the counter electrode on the hearth has become sufficiently hot to conduct sufficient DC current to assist in stabilization of the DC arcs.

As discussed above, two or more DC arc plasma electrodes are preferably used to provide one or more arcs to or within the common molten pool. One electrode is in electrical contact with the (+) terminal of one DC inductor and another electrode is in electrical contact with the (−) terminal of another DC inductor. The mid or neutral terminal of the secondary winding of the rectifier transformer may or may not be electrically connected to a counter electrode which may be at or near the bottom of the molten pool.

If only one of the two DC electrodes is arcing and the other DC electrode is submerged in the molten bath and not arcing, then the submerged electrode could be grounded. However, it is not necessary and may not be desirable to do so.

Because the preferred system employs two graphite electrodes, one electrode (+) and the other (−), then the neutral junction 428 of the three wye connected windings of the three phase transformer may or may not be connected to ground 470 (see FIG. 9).

Graphite tapping spout 426 and the metal furnace shell of unit 302 must be grounded for safety reasons. Because the graphite tapping spout is in electrical contact with the molten pool in the bottom of the furnace, this means that if the neutral terminal 428 of the wye connected secondary winding is not connected to the graphite tapping spout 426, then the two arcs are electrically in series. If one of the arcs extinguishes, then both of the arcs will therefore extinguish and this is not desirable. By connecting the neutral point 428 to the graphite tapping spout 426, each arc is effectively independent and can continue to burn notwithstanding that the other arc has extinguished. Radiation from the arc which continues to burn frequently causes the extinguished arc to reignite.

By connecting the three isolated secondary windings as shown in FIG. 6(a) or FIG. 8 and being certain that phase 422(b)–422(e) is physically connected in reverse polarity to phase 422(a)–422(d) and phase 422(c)–422(f), then the current paths through the molten bath will be such as to cause stirring and mixing of the bath and thereby increase the quantity of waste material that can be processed per hour in a given furnace.

It should also be noted that if two or three independent DC power supplies of the type shown in FIGS. 6(b) and/or FIG. 8 are used to power four or six graphite arc electrodes, this will provide additional furnace design configuration opportunities when large quantities or physically large waste materials need to be processed. The round furnace designs shown in FIGS. 7(b)–7(d) would fulfill this requirement.

In alternative embodiments of the invention shown in FIGS. 9 and 10, two circuits are provided that include thyristors in place of the saturable reactors. While conventional circuits using thyristors are known, these circuits are subject to large gaps when they are phased back, resulting in less arc stability. The circuits provided by the present invention however are more precise, less expensive and can increase arc stability. These circuits may be advantageous over the circuit shown in FIG. 8 because saturable reactors are often larger and more expensive than thyristors. The circuits shown in FIGS. 9 and 10 utilize thyristors to provide the same desirable characteristics as the saturable reactors described hereinabove, e.g. to enhance arc stability in a DC arc furnace.

Circuit 450 shown in FIG. 9 includes three phase power controls 452a, 452b and 452c. Each phase power control 452a–452c includes a thyristor switch 454a–454c respectively. Switches 454a–454c each respectively include a pair of thyristors 456a–456f. Each thyristor switch 454a–454c can be bypassed by AC linear inductors 458a–458c, respectively. Metal oxide varistors (MOV) 460a–460c connected across the thyristors of static switches 454a–454c respectively, are used to limit or clamp any transient voltages of either polarity to a level which will not damage the thyristors. Circuit breakers 431a–431c can also be provided as shown in FIG. 9.

Current transformers (CT) 462a–462f are standard AC current transformers. Current transformers 462a–462f ensure that an appropriate level of DC current is flowing between the (+) and (−) DC arc electrodes before the thyristors 456a–456f of thyristor switches 454a–454c are "turned on". Current transformers 462a–462c also ensure that if any thyristors are inadvertently "turned on", any resulting current will be rapidly reduced to a preset level of current. This will prevent the case of a DC power arc extinction, the "full phase on" of the thyristor switches which may produce an abnormally and undesirably high transient surge of DC current if the arcs through the (+) and (−) electrodes are initiated under a "full" phased on" condition.

AC linear inductors 458a–458c can limit the AC current to approximately 100 amperes RMS when the thyristors 456a–456f of thyristor switches 454a–454c are not pulsed or otherwise gated. This means that the DC current supplied by the three phase full wave diode rectifier will be on the order of 120 DC amperes if the graphite DC arc electrodes are short circuited and the thyristors are not energized. When the (−) DC arc electrode 404a and (+) DC arc electrode 404b contact an electrically conductive surface, an arc or arcs may be initiated and sustained with a current magnitude less than 120 amperes prior to firing the thyristors. This decrease in current is due to the effective resistance of the arcs. When the thyristor gates are fired, the arc current through the electric arc or arcs will increase to a magnitude which is determined by the relative phase angle and/or duration of the pulse gate.

Additionally, the firing of the thyristor switches results in an increase in the arc current since their respective linear inductors 458a–458c will be short circuited. Because current can pass through inductors 458a–458c prior to being short circuited by thyristors 456a–456f, this means that energy can be stored in inductors 458a–458c. The amount of energy stored in each inductor is E=½ L i² where E is the energy in watt seconds, L is the inductance in Henry's and i is the current in amperes.

The energy stored in the inductors can cause current to flow from inductors 458a–458c through the thyristors 456a–456f in a direction which is opposite to the current normally flowing from the transformers (462a–462c or 462d–462f) to the diode rectifier when thyristors 456a–456f are fired. It is therefore desirable to fire gates 456a–456f at such a time or phase angle so that the initial current through thyristors 456a–456f will be significantly greater than the magnitude of current flowing out of inductors 458a–458c. If before the thyristor gate is pulsed, the initial current from the inductor is greater than the forward current through the thyristor before gate "turn on" of the thyristor is completed, the thyristor may be momentarily "turned off". On the other hand, if the gate pulse is sufficiently long, then the thyristor will quickly "turn on" again and remain in the "turned on" condition until its normal power frequency "current zero" is reached, at which time it is necessary and desirable to have this thyristor "turned off".

The wye connected transformer neutral 428 is connected to ground 470 and also connected to a counter electrode 406 in the center of the furnace hearth. This further enhances arc stability under a variety of conditions which may otherwise cause arc instability or arc extinction.

Current transformers (CT) 462a–462f are standard AC current transformers and current transformers (CT) 464a–464c are DC type current transformers. Current transformers 462d, 462e, 462f, 464a and 464b provide feedback information to an automatic current control circuit to maintain essentially a constant preset amount of current under varying arc voltage conditions. Current transformer 464c senses any unequal current between the (−) arc electrode 404a and (+) arc electrode 404b and provides the signal to correct any undesirable current unbalance in the neutral circuit 428. Capacitors 466a–466f minimize the transient voltage across the diodes 398a–398f. Capacitors 466a–466f and resistors 421a–421f are known as snubber circuits. MOV 468 is used to decrease the magnitude of transient voltage which may appear across (+) and (−) DC rectifier terminals such that the current passes through clamping diode 472.

Referring now to FIG. 10, an alternative embodiment of the circuit shown in FIG. 9 is shown. The circuit 480 shown in FIG. 10, which is designed to accomplish the same objectives as the circuit shown in FIG. 9, includes two different power rectifier circuits 482, 484.

The "start up" rectifier circuit 482 includes a three phase diode rectifier 486 with an output current rating on the order of 10% of the main power rectifier 474 output current. In addition, the secondary voltage 490 of this "start up" rectifier transformer must be less than the secondary voltage 462 of the main power transformer. For example, if the secondary voltage 462 of the main power transformer is 277/480 volts, this circuit will deliver 648 volts DC. If the secondary voltage 490 of the "start up" rectifier transformer is 240/415 volts, then its DC voltage will be 560 volts. The difference in DC voltage permits the following sequence of events to take place during start up and normal furnace operation.

(−) DC electrode 404a and (+) DC electrode 404b can be placed in contact with an electrically conductive surface, such as molten pool 332. Circuit breakers 494 (CB1), 496 (CB2) and 498 (CB3) are closed such that DC current flows from diode rectifier 486 (DR1). The magnitude of this DC current is limited by the linear inductors 500a–500c ($L_1$) which deliver AC power to the AC input of diode rectifier 486 (DR1).

The gate firing circuit 486 is controlled so that during the above start steps there are no firing pulses delivered to the thyristors 504a–504f of thyristor rectifier 474. This means that thyristor rectifier 474 (TR) is not supplying any DC voltage or current to the (−) and (+) electrodes, 404a and 404b, respectively.

When firing pulses are delivered to thyristors 504a–504f in power rectifier 474 (TR), then its DC output voltage will increase until it exceeds the 560 volts DC from the "start up" rectifier. This power rectifier may then increase its current to a preset level and will maintain this preset level even though the resistance between the (+) and (−) electrodes may vary over a relatively wide range.

During the interval when none of the thyristors are "turned on" or "fired" by their respective gate pulses, the starting diode rectifier 486 (DR1) maintains a low current arc thereby producing and maintaining a stable DC arc or arcs.

In order to be sure that a large magnitude of transient current is not delivered between (+) to (−) or (+) to N or (−) to N because there was no previous arc or other current path between these electrodes and the control circuit does not recognize this open circuit condition, DC current transformers 508a (CT1), 508b (CT2), 508c (CT3) and 508d (CT4) sense this condition and cause the following to occur.

The firing pulses are "turned off" until current transformers 508a (CT1) and 508b (CT2) sense that the anticipated level of current is flowing in a reasonably steady manner between (−) DC electrode 404a and (+) DC electrode 404b. With current transformer 508a (CT1) and 508b (CT2) showing that DC current is flowing in (−) DC electrode 404a and (+) DC electrode 404b, then the firing pulses may "turn on" and automatically increase the DC current to their respective preset current levels.

In the event that the voltage (+) to N and the (−) to N are abnormally unequal and if there is no current flowing from the electrode showing the higher voltage, then the electrode showing no current may be automatically lowered until the current and voltage is brought within their normal operating current range.

Metal oxide varistor 510 (MOV 1) and diode 512 (D1) are used to limit the transient DC voltage imposed on rectifiers 486 (DR1) and 474 (TR). Inductors 514 ($L_2$) can store energy and deliver the stored energy rapidly (at a rate much faster than the phase angle control which is possible by the thyristor connected circuit), thereby preventing the arc from extinguishing. Current transformer 508e (CT5) is in the transformer neutral circuit. If the currents supplied to the (+) and (−) electrodes are equal, then current transformer 508e (CT5) current is zero. If theses currents are unequal, then current transformer 508e (CT5) adjusts the electrode gap until the circuits are equal.

The circuits described above allow the joule heating AC power supply to provide near constant melt temperatures throughout the glass tank, thereby minimizing sizing constraints for the arc, i.e. arc power, electrode diameter, and the like. The DC arc is primarily present in the furnace-melter for feed rate enhancement. This makes this newly configured melter technology more flexible than any other available vitrification systems. The arc supplies the energy in the unmelted overburden of incoming feed, and the joule heated portion of the melter system maintains the hot glass pool to ensure complete dissolution and mixing of the glass mixture as well as longer residence time for waste decomposition.

If the arc technology was used alone, the electrode hearth diameter ratio would have to be large to ensure that the contents in the hearth are melted sufficiently not only at the center of the hearth, but also at the walls of the hearth. The size of the hearth therefore would be limited due to practical limitations on electrode diameter. When the hearth or glass tank is joule heated, however, this limitation no longer exists and the tank can be sized to ensure the residence time is adequate for complete mixing and dissolution of all glass components.

If the melter technology were employed without the arc, the feed rates would be much lower due to limitations in heat transfer from the melt pool to the unmelted feed above the molten glass. To accommodate large throughput requirements, the standard approach is to increase the melt surface area. Accordingly, the joule heated melter would need to be much larger for a given processing rate than the combined arc melter system of the present invention. The present invention utilizes the benefits of both the DC arc and AC joule heated melter technologies, and does so in a single optimized system.

Joule heating alone may be used to maintain the molten bath during long idling periods, thereby reducing electrical power requirements. Moreover, because the molten bath is electrically conducting the arc plasmas may be readily restarted in the transfer arc mode.

The combination of the arc plasma furnace and joule heated melter in accordance with the present invention provides a method of quickly heating feed waste material resulting in higher processing rates for a given sized furnace system. The controlled heating rate also results in the production of a higher quality of pyrolysis gas. More energy is recovered and there are less pollutants in the gas emissions. Additionally, the joule heated melter of the present invention provides a larger reservoir with demonstrated mixing to produce a homogeneous glass product with very high stability. This is beneficial since vitrified glass product is stable over geologic time frames. See e.g., Buelt et al., *In Situ Vitrification of Transuranic Wastes: Systems Evaluation and Applications Assessment*, PNL-4800 Supplement 1, Pacific Northwest Laboratory, Richland, Wash. (1987). Additionally, the present invention provides further volume reduction through the vitrification of the ash as compared with that ash that would be generated from incineration alone. See, Chapman, C., *Evaluation of Vitrifying Municipal Incinerator Ash, Ceramic Nuclear Waste Management IV*, Ceramic Transactions, G. G. Wicks, Ed., Vol. 23, pp.223–231, American Ceramic Society (1991).

The products produced in accordance with the present invention can be vitreous, glass-like materials. Alternatively, the structure of the materials can be devitrified and crystalline in nature. In addition, the products can be ceramic materials having properties ranging from pure crystalline materials to amorphous vitreous products, or any combination thereof. The crystallinity or non-crystallinity of the products can be altered by the composition of the feed material (including, but not limited to, the addition of additives during processing in the unit) and/or by alteration of the slag after the slag has been poured or removed from the waste conversion unit. Because crystallinity can have beneficial or detrimental affects on the stability and/or non-leachability of the final products formed, treatment of the slag after removal from the waste conversion unit can be modified according to the desired characteristics of the final product.

As discussed above, the present invention provides methods and apparatus that facilitate rapid pyrolysis. Rapid pyrolysis results in a pyrolysis gas having higher purity than other means of pyrolysis. The high purity gas facilitates use with recently developed high efficiency small gas turbine technology, thereby significantly increasing efficiency as compared with conventional steam turbines and decreasing the unit size of the turbine required. The DC arc provides a high temperature heat source to accomplish the fast pyrolysis effectively. Graef, et al., *Product Distribution in the Rapid Pyrolysis of Biomass/Lignin for Production of Acetylene*, Biomass as a Nonfossil Fuel Source, American Chemical Society (1981) have shown that under conditions such as those found in a plasma furnace, municipal solid waste can be pyrolyzed into a gaseous product as shown in Table 1.

TABLE 1

Gas Composition from Pyrolysis of MSW in Plasma Furnace.

|  | Fast Pyrolysis | Normal Pyrolysis |
|---|---|---|
| Percent Conversion to useful gas for combustion | >65% | 45%–50% |
| Gas Species |  |  |
| $CO_2$ | 2% | 10% |
| CO | 44% | 50% |
| $H_2$ | 43% | trace |
| $CH_4$ | 2% | 38% |
| Light HC's | bal | bal |
| HHV (BTU/SCF) | 350–400 | 300–350 |

It is important to note that in comparing normal pyrolysis to that of rapid pyrolysis, a greater fraction of the incoming waste is converted to gas. Thermal or normal pyrolysis promotes liquefaction giving only 45–50% conversion to pyrolysis gases, while rapid pyrolysis has gas yields of greater than 65%. Rapid pyrolysis of municipal waste has been demonstrated using a water cooled, metal plasma torch. See, Carter, et al., *Municipal Solid Waste Feasibility of Gasification with Plasma Arc, Industrial and Environmental Applications of Plasma*, Proceedings of the First International EPRI Plasma Symposium (May 1990). In the partial oxidation mode of operation, the residue from both techniques is oxidized to offset the pyrolysis energy requirements.

The pyrolysis gases produced in accordance with the present invention are well suited for combustion in a state of the art, high efficiency gas turbine generator. With the efficiency of new gas turbine-combined cycle systems approaching 50%, the present method of waste-to-energy conversion provides an effective alternative to standard waste incinerators. Under favorable conditions, the incinerator-steam generator systems achieve 15–20% efficiency in the conversion of the potential energy contained in the waste to usable electric energy.

A prophetic illustrative comparison of the complete waste conversion system of the present invention to that of standard incinerator-steam generator systems is summarized in Table 2.

TABLE 2

Relative Energy Balances and Net Cost Information for Arc Furnace and Joule Heated Melter vs. Standard Incinerator-Steam Generator Technology (Basis = 1 ton MSW).

|  | Arc Furnace-Melter | Incinerator |
|---|---|---|
| Energy requirements to operate system | $2.1 \times 10^6$ BTU | — |
| HV in Incoming MSW | $1 \times 10^7$ BTU | $1 \times 10^7$ BTU |
| Losses | $3.1 \times 10^6$ BTU | $8.8 \times 10^6$ BTU |
| HV in Exiting Gas | $9 \times 10^6$ BTU | — |
| Efficiency for electrical conversion | 0.4 | 0.15 |
| Net Energy (Electric Produced) | $1.5 \times 10^6$ BTU | $1.5 \times 10^6$ BTU |
| Value of Electricity ($0.05/Kwh) ($) | 22.00 | 22.00 |
| Disposal Costs including transportation ($) | — | 15.00 to 75.00 |
| Net Cost/Income ($) | (+) 22.00 | (+) 7.00 to (−) 53.00 |

HV = heat value; MSW = municipal solid waste.

An assumption is made for the comparison of the two technologies, namely that the glass or slag product produced in the arc furnace of the present invention is a useful product, although no value has been assigned to the glass for this comparison. At a minimum, however, this material is a stable nonhazardous material that can be easily disposed of in any non-hazardous landfill. It is also assumed that the municipal solid waste (MSW) incinerator employed in a highly populated area such as the Northeastern United States produces ash that either must be shipped to a standard landfill or a hazardous waste landfill. Energy and cost are given per ton of MSW processed based on currently available data.

The energy requirements to operate the system are given in a relative bases, i.e. the value shown as "energy requirements to operate system" for the arc furnace-melter is that in excess of what is required for the incinerator. The incoming heating value of the waste is a composite value from multiple references. See e.g., Carter, et al., *Municipal Solid Waste Feasibility of Gasification with Plasma Arc, Industrial and Environmental Applications of Plasma*, Proceedings of the First International EPRI Plasma Symposium (May 1990); *Renewable Energy—Sources for Fuels and Energy*, Johansson, Editor, Island Press, Washington, D.C. (1993); and *Clean Energy from Waste & Coal*, Khan, Editor, American Chemical Society Symposium Series, American Chemical Society, Washington, D.C. (August 1991, published 1993). The net energy produced for either option was determined using a 40% and 15% efficiency for the arc furnace-melter-gas turbine generator, and incinerator-boiler-steam turbine generator options, respectively. See, *Clean Energy from Waste & Coal*, Khan, Editor, American Chemical Society Symposium Series, American Chemical Society, Washington, D.C. (August 1991, published 1993); and *Perry's Chemical Engineers' Handbook*, 6th Ed., Ch. 26. The losses presented in Table 2 are the difference between incoming heat value in the waste and the energy input minus the net energy out. Losses for the incinerator option are higher due to the inefficiencies of the combination of the boiler and steam generator as opposed to pyrolysis gas fired turbine generators. See, *Perry's Chemical Engineers' Handbook*, 6th Ed., Ch. 26. The disposal costs for the ash represent values obtained from literature and data currently available from waste handling facilities. See e.g., *Recycling and Incineration*, Dension, et al., Ed., Island Press, Washington, D.C. (1990). If new rulings and current trends involving the handling of ash as a hazardous waste continue, the disposal costs would be in the high end of the range given in Table 2. Under these circumstances, the present invention of utilizing the arc furnace-melter combination provides an additional advantage over the prior art.

The high quality, vitrified products produced in accordance with the present invention may be used in a variety of applications. For example, the vitrified products may be crushed and incorporated into asphalt for use in roads and the like. Alternatively, the vitrified products may be utilized to replace cinder in cinder or building blocks, thereby minimizing absorption of water within the block. Further, the vitrified products may be solidified to a final form which exhibits substantial volume reduction over prior art vitrification products. The solidified form is suitable for disposal without health risks or risks to the environment.

In another embodiment of the invention, tunable arc plasma-melter systems are employed utilizing a molten oxide pool. The composition of the molten oxide pool can be modified to have electrical, thermal and physical characteristics capable of processing metals, non-glass forming wastes and low-ash producing wastes in a manner capable of generating a low to medium BTU gas. The conductivity of the molten pool is controlled by adding melt modifier materials so that the joule heated portion of the system can effectively maintain the temperature of the melt even when under conditions such as 100% joule heating operation. It is desirable to maintain the electrical resistivity of the molten pool in a certain range. For example, for some configurations of the tunable arc plasma melter, it is desirable that the molten pool composition be maintained with an electrical resistivity above 1 Ohm-cm for effective joule heating of the molten oxide pool. Preferably, the electrical resistivity is in the range of 1–200 Ohm-cm, and more preferably, in the range of 5–15 Ohm-cm.

This embodiment of the invention provides tunable arc plasma-melter systems exhibiting a high degree of controllability and efficiency for a wide variety of waste streams that have been particularly difficult to treat in the past. Exemplary non-glass forming wastes include tires and metals such as iron. Illustrative low-ash producing organics include plastics, oils, solvents and the like. Waste streams such as hazardous organic liquids, mixtures of low-ash producing organics and metals, or organic matter with limited ash content and high metal content are all processable with the controlled composition molten oxide pool variation of the tunable plasma arc melter system. Wastes such as sludges containing primarily reduced metals are not well suited for processing in joule heated glass tanks due to the high electrical conductivity of the resultant melt. However, using the controlled composition oxide pool mode of operation, the tunable arc plasma process can even process melts that result in molten metal baths which are gravimetrically separated from the slag.

Figure 11:
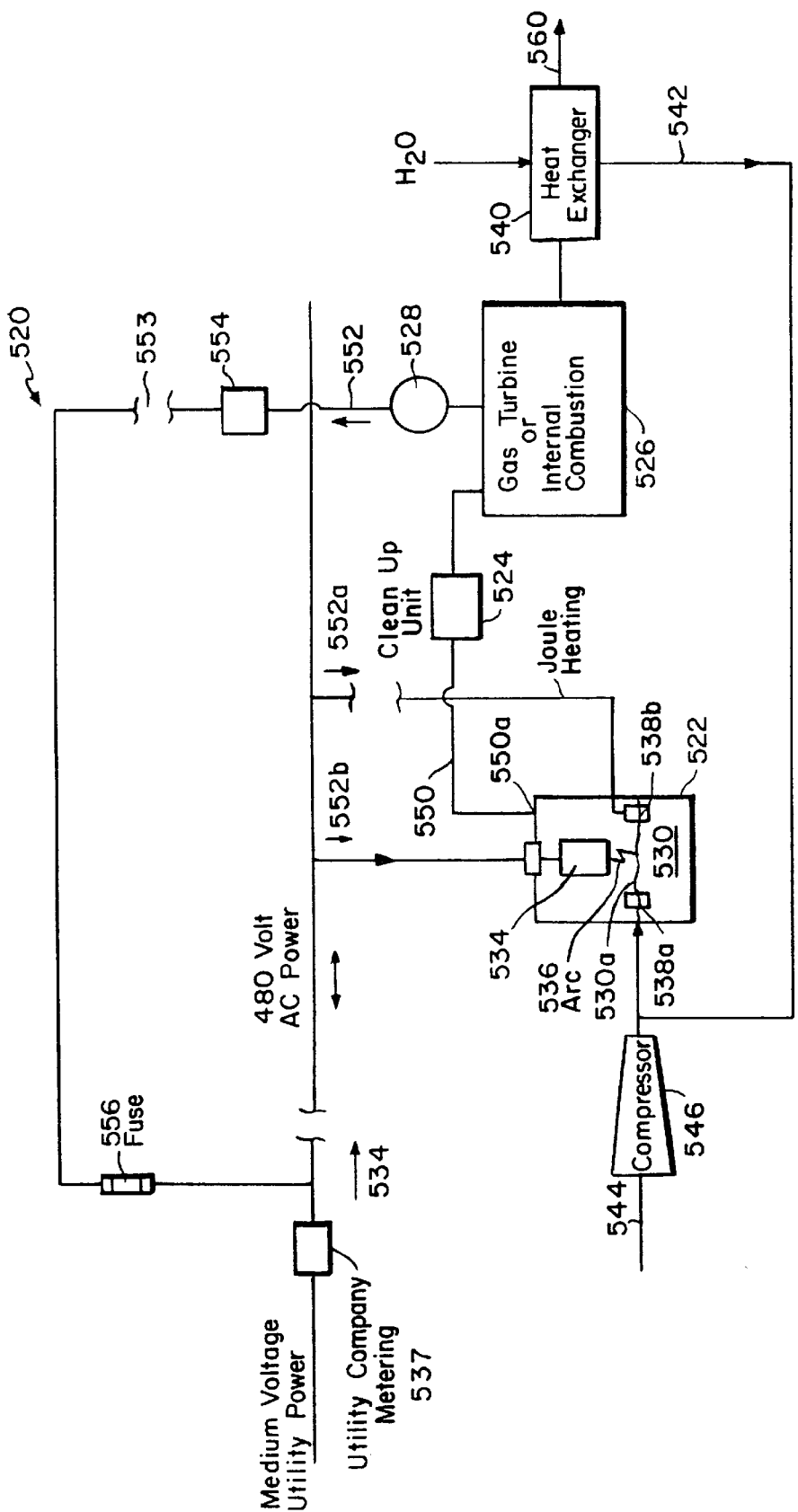
FIG. 11 illustrates an electrical system of an alternative embodiment of the invention which is suitable for processing metals, non-glass forming waste, and low-ash producing organics.

A system suitable for processing of metals, non-glass forming wastes and low-ash producing inorganics according to the present invention is illustrated in FIG. 11. The system 520 includes furnace 522, clean-up unit 524, a gas turbine or internal combustion engine 526 and generator 528. System 520 may also include heat exchanger 540 and compressor 546.

As discussed in greater detail herein, a waste stream such as sludge containing metals, non-glass forming wastes and low-ash producing inorganics is introduced into furnace 522. The waste stream is combined with a molten oxide pool 530 having a composition with desired electrical, thermal and physical characteristics. Molten pool 530 is contacted with DC arc 536. DC arc 536 can be operated using DC arc electrode 534 in combination with joule heating electrodes 538*a* and 538*b* as described hereinabove. It will be appreciated by those skilled in the art that various furnace configurations may be suitable for use in the system shown in FIG. 11. For example and as shown in FIGS. 7(*a*)–7(*d*), joule heating electrodes may include more than two electrodes and additional DC arc electrodes may be employed.

During the processing of some waste streams, it may be desirable to contact the surface 530*a* of molten oxide pool 530 with a predetermined amount of steam 542. Steam 542, for example, can be employed to facilitate the use of a water-gas reaction as follows:

$$C + H_2O \rightarrow CO + H_2 \qquad (1).$$

Steam 542 is introduced into furnace 522 directly above or at the surface 530*a* of molten pool 530. In this manner, carbonaceous waste materials may be processed and transformed to form a hydrogen-rich gas 550. The hydrogen-rich gas 550 produced by the system exits through port 550*a* and is cleaned in clean up unit 524. Hydrogen sulfide ($H_2S$), sulfur oxides ($SO_x$) and hydrogen chloride (HCl) are removed from hydrogen-rich gas 550 in clean up unit 524.

Clean up unit 524 may be a scrubber(s) or the like. The hydrogen-rich gas is then combusted in an internal combustion engine 526. Internal combustion engine 526 is connected to generator 528 to produce electricity 552. In an alternative embodiment, internal combustion engine 526 may be substituted with a high efficiency gas turbine.

Figure 14A:
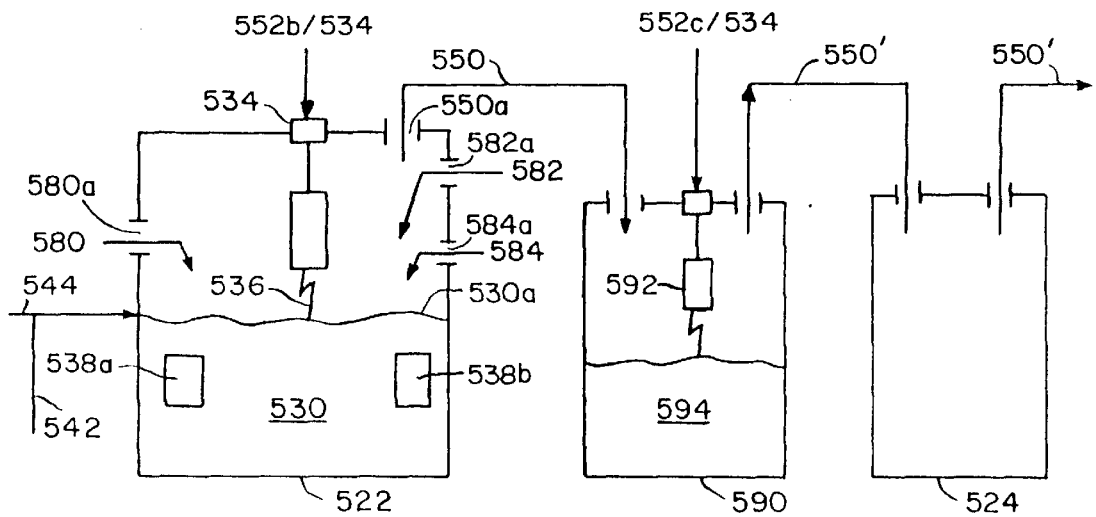
FIGS. 14(a) and 14(b) shows a furnace and molten oxide pool for processing non-glass forming waste and low-ash producing organics in accordance with the invention.
Figure 14B:
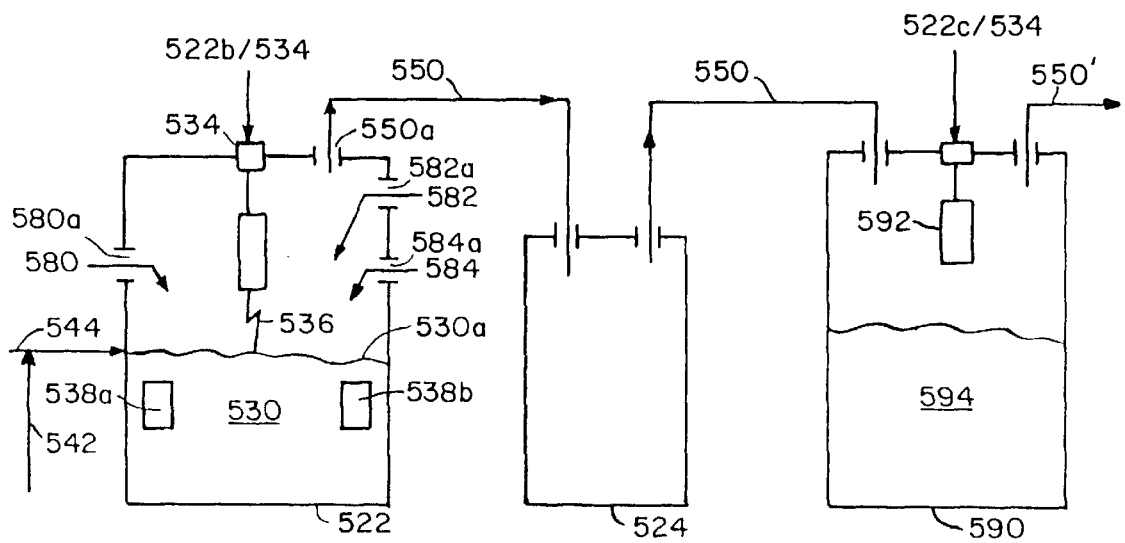

Electricity 534 may be supplied accordingly from an external source such as a utility company to provide power for the DC arc and joule heating functions of furnace 522. Such electricity is subjected to monitoring 537 or the like. Additionally, a portion 552b of electricity 552 can be used to assist in powering DC arc electrode 534 while a portion 552a of electricity 552 can be used to assist in powering the joule heating electrodes. A portion of electricity 552c may also be utilized in a secondary plasma reaction chamber (as shown in FIGS. 14(a) and 14(b)). Additional electricity 552 can be sold or utilized in a commercial manner. Such electricity exits generator 552 and can be controlled by circuit breaker 554, transformer 553 and fuse 556.

Figure 12:
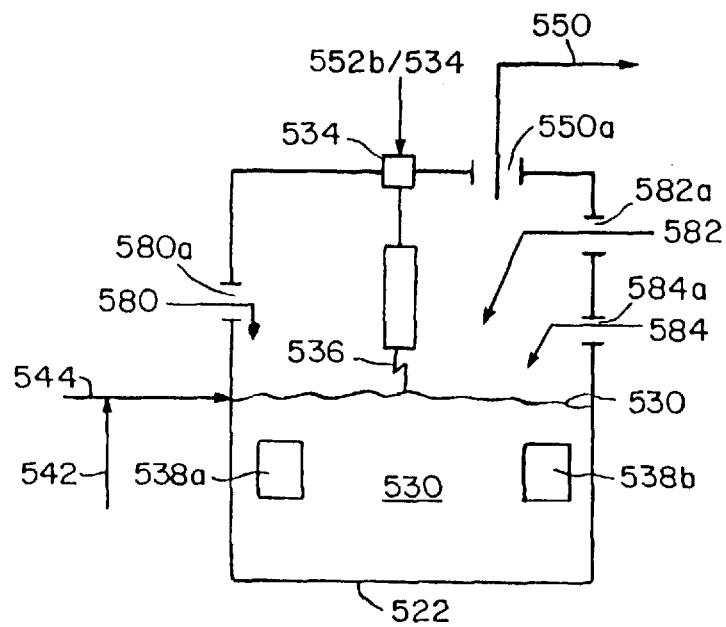
FIG. 12 shows a furnace and molten oxide pool for processing metals, non-glass forming waste, and low-ash producing organics in accordance with the invention.
Figure 13:
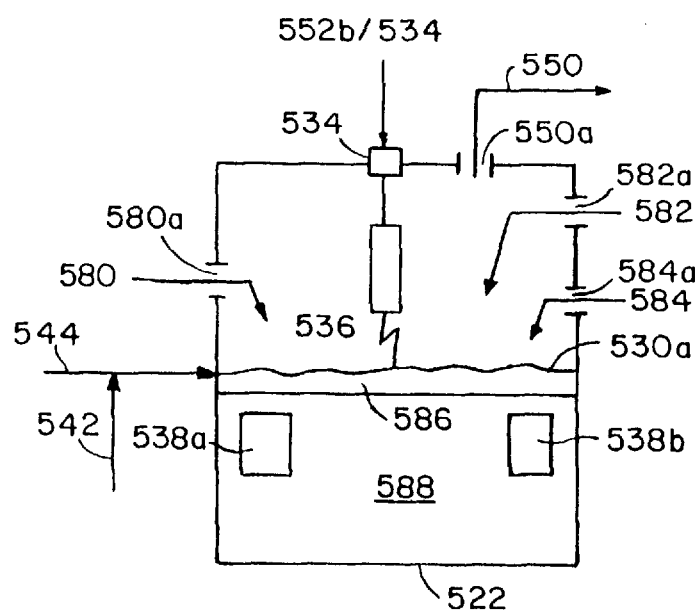
FIG. 13 shows a furnace and molten oxide pool for processing metals in accordance with the invention.

Waste heat in exhaust gas 560 from the gas turbine or internal combustion engine 526 can be used to produce steam 542 for the water-gas and water shift reactions by employing heat exchanger 540 as shown in FIG. 11. Controlled quantities of air 544, may under certain circumstances, be introduced into system 520 using compressor 546. Such circumstances may occur where energy recovery is not desired or practical, e.g. if is determined that the waste form redox state must be higher to ensure a stable waste form. Under these conditions, the furnace system has the capability to operate under fully oxidizing conditions. Furnace 522 is constructed such that the amount of air entering the system can be controlled. For example, ports such as 580a, 582a and 584a discussed herein in connection with FIGS. 12–14 are designed to allow introduction and/or removal of various streams into furnace 522. The constituents of the molten pool are chosen to be optimum for a given waste stream without allowing undesirable ingress or egress of air therethrough.

The present invention allows the use of a molten oxide pool from material other than the primary waste material being processed to provide the desired medium for effective use of the tunable arc plasma-melter portions of the system. Referring to FIG. 12, a furnace suitable for processing metals, non-glass forming wastes and low-ash producing inorganics is illustrated.

As discussed above in connection with FIG. 11, furnace 522 includes one or more DC arc electrodes 534 capable of generating DC arc 536. Furnace 522 also includes joule heating capabilities, including joule heating electrodes 538a and 538b.

Primary waste stream 580 to be processed is introduced into furnace 522 through port 580a. Melt modifier(s) 582 is introduced into furnace 522 through port 582a. Alternatively, or in addition to melt modifier 582, a secondary waste stream 584 having desired glass forming characteristics is introduced into furnace 522 through port 584a.

The constituents of the molten pool are chosen to be optimum for a given waste stream. While not to be construed as limiting, melt modifiers 582 may for example include dolomite ($CaCO_3 \cdot MgCO_3$), limestone (e.g. calcium carbonate, $CaCO_3$), sand (e.g. glass maker's sand), glass frit, anhydrous sodium carbonate (soda ash), other glass forming constituents and/or sand combined with metals. It will be appreciated by those skilled in the art that other glass melt modifiers may be used in accordance with the present invention. The molten oxide pool may also be formed utilizing melt modifier combinations of secondary wastes and material(s) other than the primary waste being treated. For example, the secondary waste with the proper glass forming composition may be simultaneously fed to the furnace with the primary waste and/or other melt modifier(s) to maintain the molten oxide pool within the proper compositional range. The constituents of the molten pool are selected based upon a given waste stream. This mode of operation provides a high degree of flexibility in the operation of the tunable arc plasma-joule heated melter system, thereby broadening the waste types for which the system can treat.

It should be appreciated by those skilled in the art that the molten oxide pool provides flexibility beyond that of either the joule-heated melter or standard plasma arc processes relative to melt modifier addition. With highly conductive oxide mixtures, a joule heated system may be ineffective or unable to maintain melt bath temperature without the added energy provided by the arc. Conversely, with highly resistive oxide melts, the potential across the joule heated electrodes can become unacceptably high and adequate current cannot be maintained to provide joule heating. The supplemental energy can be provided by the arc. The arc energy, however, can be limited in both of these situations to provide only enough energy to process incoming waste and supplement joule heating energy to maintain melt bath temperature. The molten oxide pool embodiment of the present invention provides a much greater degree of flexibility in melt adjustment using melt modifiers than either that of a joule-heated melter system or a standard arc plasma process.

The melt modifiers 582 and/or secondary waste stream 584 are selected to provide a molten pool having desired electrical, thermal and physical characteristics. The type and amount of melt modifiers are determined for the specific vitrification unit configuration and waste stream. For example, the molten pool in the case of processing tires in a waste stream 580 provides sufficient conductivity to use the joule heated melter subsystem in the more optimum mode of operation. As discussed above, steam is added in the desired amounts directly above or to the molten pool to facilitate the use of a water-gas reaction or to remove excess carbonaceous material.

FIG. 13 illustrates a furnace suitable for processing certain metals utilizing a molten oxide pool in accordance with the invention. When metals are being processed, the controlled composition molten pool may be altered such that a molten metal oxide layer is disposed above a dense metal layer in the furnace hearth. Preferably, the positioning of the joule heating electrodes can be varied according to the type and volume of waste being processed. When the waste feed material has a high metals content for example, the joule heating electrodes may be raised or lowered to adjust or "tune" the effective resistive path between electrodes. This may be required if the metal layer is allowed to increase to a point where the electrical path between the joule heated electrodes is effectively "shorted'" due to contact or near contact with the highly conductive metal layer. In addition, the number of joule heating electrodes can be varied depending on the type and amount of waste material being processed.

As further shown in FIG. 13, molten metal oxide layer 586 is disposed above a dense metal layer 588 in the furnace 522. The conductivity of the joule heated molten pool 586/588 is controlled by adding melt modifier materials 582 and/or secondary waste stream materials 584 such that the joule heated portion of the system can effectively maintain the temperature of the melt even when under conditions such as 100% joule heating operation.

It is desirable to maintain the electrical resistivity of the molten pool in a certain range. For example, for some configurations of the tunable arc plasma melter, it is desirable that the molten pool composition be maintained with an electrical resistivity above 1 Ohm-cm for effective joule heating of the molten oxide pool. Preferably, the electrical resistivity is in the range of 1–200 Ohm-cm, and more preferably, between 5–15 Ohm-cm.

FIGS. 14(a) and 14(b) illustrate exemplary primary and secondary furnace configurations in the accordance with the present invention. In the case of automobiles and truck tires or other non-glass forming waste streams, the tunable molten oxide pool plasma arc melter process allows for the efficient conversion of whole tires into a low to medium BTU gas and any metal present is separated in a metal phase below the oxide melt layer. In this manner, tires can be removed from vehicles without dissection and are amenable to processing in the tunable arc plasma melter system. Steel belting and rim materials can be reclaimed from the molten metal phase.

To accomplish the conversion of tire rubber to primarily synthesized gas (i.e. hydrogen and carbon monoxide), steam and possibly controlled quantities of air may be added to the melt chamber in a controlled manner to facilitate a series of reactions as shown below. The steam and air mixture can be added through a port, using tuyeres or the like positioned such that the steam/air mixture will be introduced into the furnace at the melt surface. This will ensure that carbonaceous material is converted to gaseous products and not trapped in the glass/slag matrix.

Chemical equations (1)–(5) present possible reactions that will occur upon introduction of oxygen and/or steam into the melt chamber of furnace 522.

$$C+H_2O \rightarrow CO+H_2 \quad (1)$$

$$C+CO_2 \rightarrow 2CO \quad (2)$$

$$CO+H_2O \rightarrow CO_2+H_2 \quad (3)$$

$$C+O_2 \rightarrow CO_2 \quad (4)$$

$$C+2H_2 \rightarrow CH_4 \quad (5).$$

Reactions (1) and (2) are highly endothermic reactions, requiring about 131.4 kJ/mole and 172.6 kj/mole, respectively. With the controlled introduction of primarily steam at near atmospheric pressure, reaction (1), i.e. the water-gas reaction, will predominate requiring energy (i.e. 131.4 kJ/mole) to produce a hydrogen-rich gas. As discussed above, this gas is cleaned using particulate removal technology and scrubbing solutions to remove the majority of particulates and other contaminants such as sulfur and chlorine in the form of $H_2S$, $SO_x$ and HCl prior to combustion either in a gas turbine or internal combustion engine electrical generator system. Waste heat will be utilized to produce steam for the furnace chamber steam feed stream. High temperature air may be extracted from an intermediate stage in a gas turbine if additional thermal energy is required.

The processing of materials containing a high carbon to hydrogen ratio may result in the production of excess carbon (i.e. unreacted char) in the primary furnace exhaust. For example, tires typically contain a high carbon to hydrogen ratio. This excess carbon or unreacted char may be converted to useful gaseous fuel 550' or to heat in a secondary plasma reaction chamber 590 as shown in FIGS. 14(a) and 14(b). This chamber will provide thermal energy from a transferred plasma arc and/or plasma torch 592 to drive the desired reactions, i.e. reaction (1) set forth above. Electricity 552c and/or 534 can be supplied to secondary reaction chamber 590 as also shown in FIGS. 14(a) and 14(b). As in the primary furnace chamber, steam and possibly air or oxygen (not shown in FIGS. 14(a) and 14(b)) can be added directly above or to slag 594, resulting in the complete conversion of carbon and carbon containing compounds to carbon monoxide and hydrogen gas.

The char produced from high carbon content wastes (e.g. tires) may also accumulate on the surface of the oxide melt. To ensure a more complete carbon conversion, both steam and controlled quantities of air may be introduced at or above the melt line as described above. Reaction (4) described above will predominate in the presence of air, thereby resulting in a net thermal energy production of about 393.8 kJ/mole of reacted carbon. This thermal energy will drive reaction (1) in this surface zone due to the simultaneous introduction of steam and air. The air-steam mixture can be accurately controlled to provide the desired gaseous product from the furnace system. For example, the water shift reaction can be used to convert coke deposits or accumulations in the furnace hearth to carbon monoxide and hydrogen-rich gas. In some situations, it may desirable to allow a portion of the coke to remain in the furnace hearth to reduce electrode erosion.

The hydrogen-rich gas produced by the system can be cleaned and then combusted in a gas turbine or internal combustion engine and subsequently used to produce electricity in a generator. In preferred embodiments, the waste heat from the gas turbine or internal combustion engine can be used to produce steam for the water-gas reaction in the melter unit. In circumstances where an internal combustion engine or gas turbine are not employed, steam may also be obtained by partially cooling furnace off-gas 550 and using this steam for the water-shift reaction.

When carbonaceous materials such as tires are processed in a pyrolytic mode with steam and controlled quantities of air, the processed materials can produce a low to medium BTU gas suitable for combustion in a high efficiency (e.g. 35–50%) gas turbine or internal combustion engine. The tunable plasma arc melter system can also produce excess electrical power when processing the carbonaceous material in the pyrolytic mode described hereinabove. The electrical power from the gas turbine or internal combustion engine generator may be supplied to assist the furnace power supply. This system can also provide additional AC power to the joule heating portion of the melter and/or a utility company, thereby providing the opportunity to reduce operating expenses or generate additional revenue.

As discussed above, the present invention also provides environmentally attractive methods and apparatus for reduced emissions of oxides of nitrogen ($NO_x$) when the gases produced in the waste conversion unit are combusted. This can be accomplished by combusting hydrogen-rich gas and operating an internal combustion engine or a turbine in a very lean mode, i.e. a high ratio of air to fuel with hydrogen-carbon monoxide gas from the waste conversion unit as fuel, so that electricity may be produced from the hydrogen-rich gas.

"Ultra lean", as that term is used herein, refers to an equivalence ratio, $\Phi$, of 0.4–0.7 relative to stoichiometric operation. $\Phi$ is the fuel to air ratio relative to the fuel to air ratio at stoichiometric conditions where the amount of air is exactly equal to that needed to completely combust the fuel gas. Typical spark ignition engines operate at stoichiometric conditions where $\Phi=1$. See, MacDonald, *Evaluation of Hydrogen-Supplemental Fuel Concept With An Experimen-* tal Multi-Cylinder Engine, Soc. of Automotive Engineers, Paper 930737, p. 574 (1976), which is incorporated herein by reference. Use of hydrogen-rich gas in a spark ignition engine allows operation at ultra lean ratios of fuel to air. It is possible to operate at fuel to air ratios, $\Phi$, of 0.4 and possibly lower. These values of $\Phi$ are substantially lower than those allowed for other fuels. The lower allowed values of $\Phi$ result from the faster flame speed of hydrogen. The use of hydrogen-rich gas and the use of ultra lean operation also allow the use of much higher compression ratios. The combination of ultra lean operation and the use of a high compression ratio can greatly reduce pollution and increase engine efficiency. By operating in a very lean mode, e.g. with low equivalence ratios in a range of about 0.4–0.7, production of $NO_x$ may be greatly reduced, i.e. by more than a factor of 10 relative to stoichiometric operation. Hydrocarbon and carbon monoxide emissions should also be very low.

Figure 15:
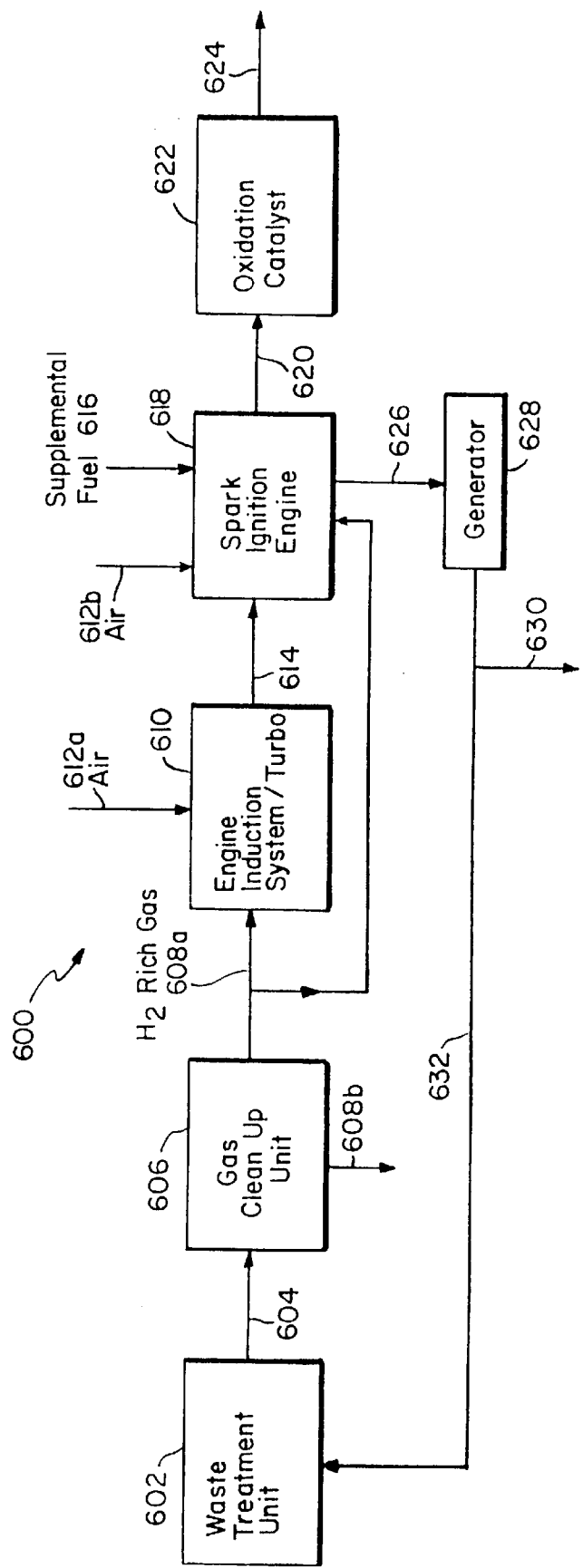
FIG. 15 illustrates an energy conversion system which reduces $NO_x$ emissions during the generation of electricity from waste conversion units in accordance with the present invention.
Figure 16:
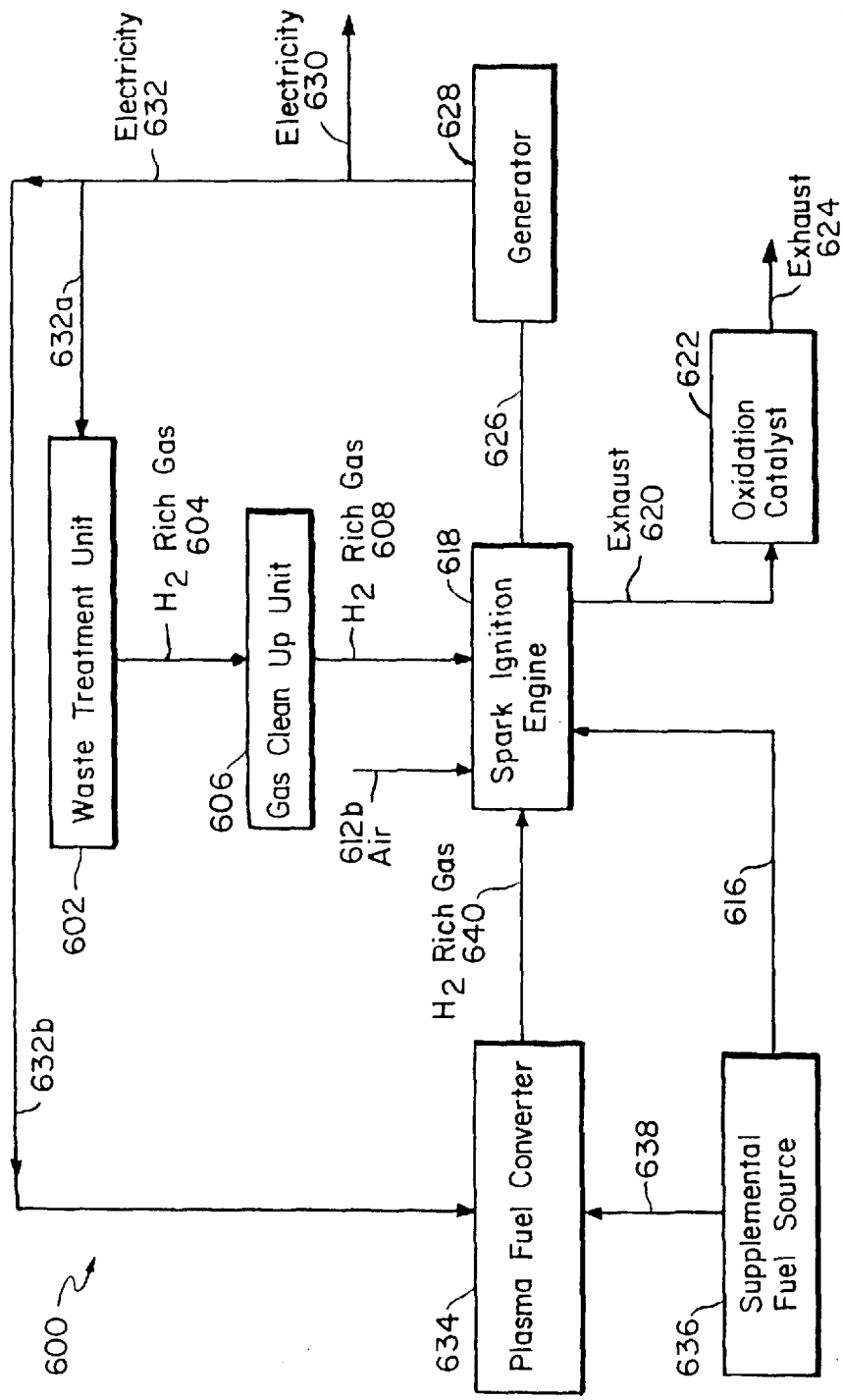
FIG. 16 illustrates an energy conversion system which reduces $NO_x$ emissions during the generation of electricity from waste conversion units in accordance with an alternative embodiment of the present invention.

Systems for reduced $NO_x$ emissions during the production of electricity from combustible gases generated by a waste conversion unit are illustrated in FIGS. 15 and 16. System 600 includes waste conversion unit 602, gas clean-up unit 606, spark ignition engine 618 or a gas turbine (not shown in FIGS. 15 or 16) and generator 628. Plasma fuel converter 634 (see FIG. 16) and/or engine induction system/turbocharger 610 (see FIG. 15) can also be utilized in system 600. Supplemental fuel 616 from a fuel source (e.g. fuel source 636 as shown in FIG. 16) and oxidation catalyst 622 can also be used in accordance with the invention.

As discussed above, combustible gases can be produced from waste conversion unit 602. Waste conversion units suitable for use in the invention include those shown and described hereinabove. Additional waste conversion units suitable for use in accordance with the invention include those shown in copending U.S. application Ser. Nos. 08/621, 424 and 08/622,762, both filed Mar. 25, 1996 and both of which are incorporated herein by reference. These waste treatment units can produce a hydrogen-rich gas containing primarily hydrogen and carbon monoxide which can be combusted to produce electricity. The electricity can be utilized to satisfy some or all of the electricity requirements for the waste treatment systems. It will be appreciated by those skilled in the art that other waste conversion units capable of producing combustible gases can be used in conjunction with system 600. See e.g., U.S. Pat. No. 5,280, 757 to Carter et al; Chapman, Evaluation of Vitrifying Municipal Incinerator Ash, Ceramic Nuclear Waste Management IV, Ceramic Transactions, American Chemical Society, Vol. 23, pp. 223–231 (1991); and U.S. Pat. Nos. 5,177,304 and 5,298,233, both to Nagel, all of which are incorporated herein by reference.

Gases 604 exit waste conversion unit 602 and are introduced into gas clean-up unit 606 for gas-solid separation, e.g. for removal and separation of ash or other particulates 608b from hydrogen-rich fuel gas 608a that may be entrained in gases 604. In some circumstances, it may also be desirable to incorporate an off-gas scrubbing process for gases exiting clean-up unit 606 or internal combustion engine 618 (or gas fired turbine) to remove any acid gases therefrom.

Hydrogen-rich gas 608a is then introduced into engine induction system/turbocharger 610 and combined with predetermined amounts of air 612a so that there is an ultra lean mixture. A turbocharger 610 could be used to increase the amount of fuel in the cylinder to compensate for the reduced power density in ultra lean operation. Turbocharger 610 could be driven from the exhaust gas from the glassification unit or steam which is produced by a heat exchanger at various points in the system. Engine induction system/turbocharger 610 allows hydrogen-rich gas 608a to be cooled prior to being introduced into the internal combustion engine 618. Cooling can increase the amount of fuel 614 that can be used per explosion. It should be noted that operation of engine induction system/turbocharger 610 may not always be necessary or desirable. Under these circumstances, hydrogen-rich gas 608a and air 612b in an ultra lean mixture may be introduced directly into spark ignition engine 618 as also shown in FIGS. 15 or 16.

Hydrogen-rich gas 614 is combusted in engine 618, thereby producing exhaust 620 and mechanical power 626. Mechanical power 626 is used to drive generator 628 to generate electricity 632 and/or electricity 630. As further shown in FIG. 15, electricity 632 can be used to supply some or all of the electricity requirements for waste conversion unit 602. Electricity 630 can be used for other electricity requirements in the system (see e.g. to supply electricity 632b to plasma fuel converter 634 as illustrated in FIG. 16). Alternatively, electricity 630 can be used for sale.

The operation of spark ignition engine 618 is preferably at lean ratios of fuel to air, $\Phi$, and at high compression ratios. For example, illustrative values of $\Phi$ are 0.4–0.7 and preferably about 0.5. Illustrative values of compression ratio, r, are 12 to 15. In contrast, typical spark ignition engines that operate on gasoline operate with $\Phi$ equal to 1 and r at about 10. In addition, gas turbines may be capable of being operated at $\Phi$ ratios of 0.4 or less.

While not to be construed as limiting, it is expected that the efficiency of the spark ignition engine can be increased by a relative amount of approximately 20% by using ultra lean operation (i.e. the efficiency can be increased for example from approximately 30% to 36%). In addition, utilizing compression ratios of about 15 is expected to provide an additional relative increase in efficiency of about 15%. By increasing the compression ratio from the standard spark ignition value of 10 to a value of around 15, the thermal efficiency can therefore be further increased from 36% to 42%. See Ganesan, Internal Combustion Engines, McGraw-Hill, Inc. (1995), which is incorporated herein by reference. A thermal efficiency of 42% is substantially higher than that of present gas turbine technology for powers that are less than 1 MW (a 100 kW level gas turbine, for example, has an efficiency of about 30%). Moreover, the spark ignition engine is typically less expensive and is generally easier to stop and start. It should be noted, however, that a gas turbine using lean operation can be employed in the present invention (see e.g. turbine 56 in FIG. 1(a)).

Ultra lean operation can dramatically reduce $NO_x$ emission. It is expected that $NO_x$ levels can be more than 10 times lower than $NO_x$ levels produced using standard stoichiometric operation. $NO_x$ emissions will decrease with decreasing equivalence ratios as the equivalence ratio is reduced below the upper end of the ultra lean mode of operation ($\Phi$=0.7). In addition, hydrocarbon emissions should be very small because the hydrogen-rich gas typically will contain only a small fraction of hydrocarbons and it is expected that there will be very complete combustion of these small levels of hydrocarbons. Moreover, carbon monoxide (CO) emissions are expected to be low due to a high degree of combustion of CO. Additional CO reduction can be obtained by use of a simple oxidation catalyst. Referring again to FIG. 15 for example, exhaust 620 can be combined with an oxidation catalysts 622 to produce low pollution exhaust 624. Oxidation catalysts suitable for use in the invention include, but are not limited to, platinum and iridium. The exhaust heat from the engine 618 could be used to provide steam for heating and/or other applications in a cogeneration mode.

It is also expected that levels of $NO_x$, CO hydrocarbons, hydrocarbons and particulates produced in accordance with the invention can be significantly lower than emission levels from small diesel generator power stations. Emission levels according to the present invention are also expected to be no greater than those from natural gas fired turbine electricity generating plants with relatively large power generation capacity which have extensive pollution control equipment.

When hydrogen-rich gas 604 production from the waste treatment unit 602 is not sufficient to power internal combustion engine 618, it may be desirable to directly add a certain amount of supplemental fuel 616 (such as natural gas) to engine 618 in order to continue ultra lean spark ignition engine operation as shown in FIGS. 15 and 16. FIG. 16 illustrates the integration of a supplemental fuel system with the spark ignition engine suitable for use in the invention.

Figure 17:
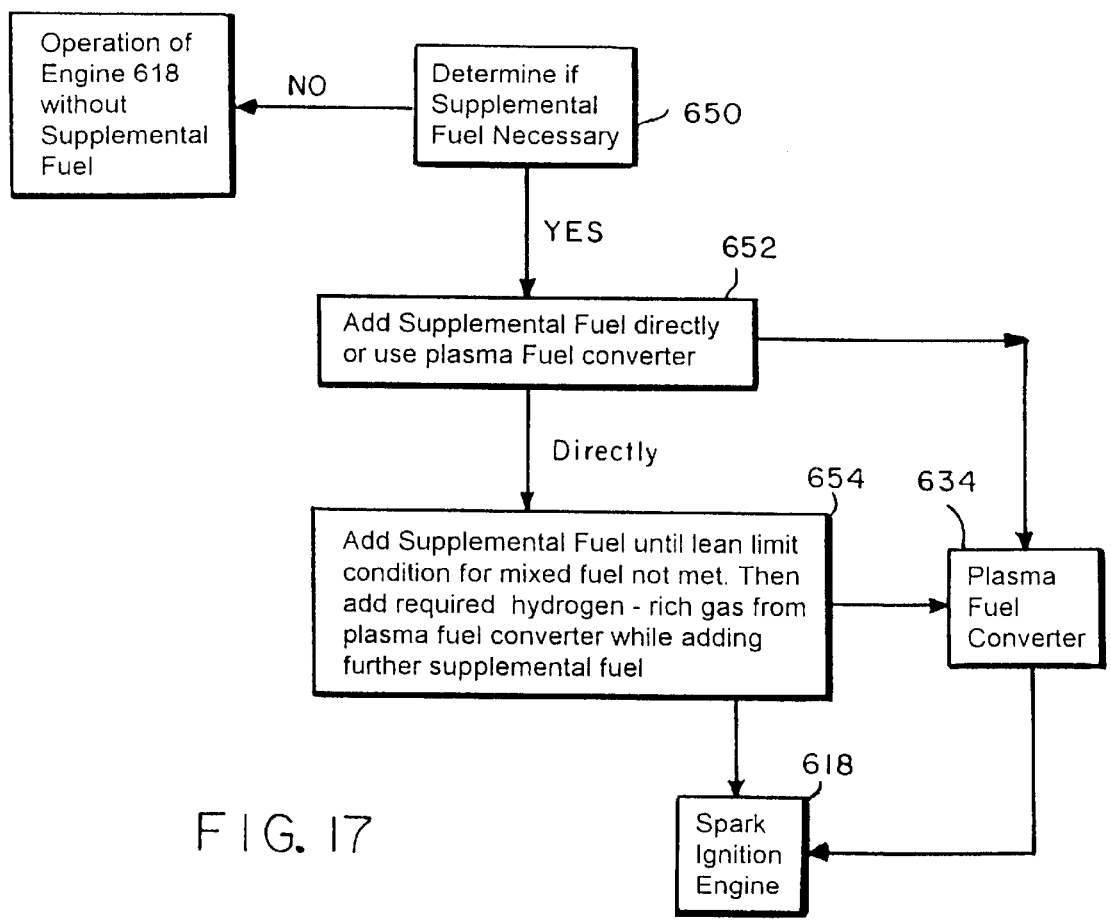
FIG. 17 illustrates automatic control logic for use in conjunction with the production of low $NO_x$ emissions during the generation of electricity from waste conversion units in accordance with the present invention.

System 600 shown in FIG. 16 is similar to system 600 shown in FIG. 15, but includes plasma fuel converter 634 (the use of which may be automatically controlled as shown for example in FIG. 17). While not shown in FIG. 16, it will be appreciated that system 600 can be employed using engine induction system/turbocharger 610 (as shown in FIG. 15) and plasma fuel converter 634.

As further shown in FIG. 16, plasma fuel converter 634 can supply additional hydrogen-rich gas 640 to spark ignition engine 608. This may be desirable or necessary where the amount of hydrogen-rich gas 608 (and/or supplemental fuel 616) is insufficient to power engine 618 in the desired lean operation mode or using high compression ratios.

Plasma fuel converter 634 receives supplemental fuel 638 from supplemental fuels source 638 and reforms the fuel 638 into hydrogen-rich gas 640. Plasma fuel converters suitable for use in the present invention include, but are not limited to those disclosed in U.S. Pat. Nos. 5,425,332 and 5,437,250, both to Rabinovich et al. U.S. Pat. Nos. 5,425,332 and 5,437,250 are both incorporated herein by reference. Hydrogen-rich gas 608 and 640 can therefore be used to ensure operation of engine 618 in a lean mode.

The present invention thus allows various combinations of supplying fuel to engine 618 to ensure operation in a lean mode and/or using high compression ratios, thereby providing highly efficient, cost effective and environmentally attractive systems. For example, hydrogen-rich gas 608 from waste conversion unit 602 can be used alone to supply fuel to engine 618. Alternatively, hydrogen-rich gas 618 can be combined with supplemental fuel 616 (such as natural gas) in engine 618 in proportions such that lean operation of engine 618 is maintained. Plasma fuel converter 634 can also be utilized to supply additional hydrogen-rich gas 640 to engine 618 with hydrogen-rich gas 608 or with hydrogen-rich gas 608 and supplemental fuel 616.

An exemplary automatic control system for determining when supplemental fuel and/or operation of the plasma fuel converter is desirable or necessary is shown in FIG. 17. If supplemental fuel is determined to be necessary in step 650, it is then determined in step 652 if supplemental fuel is to be added directly into engine 618 or if supplemental fuel is to be added to plasma fuel converter 634 for production of hydrogen-rich gas 640.

If supplementary fuel is added directly to engine 618 (step 654), supplemental fuel is added until a lean limit condition for mixed fuel operation is not met. Additional hydrogen-rich gas 608 and/or hydrogen-rich gas 640 can then be added as appropriate.

The addition of hydrogen-rich gas into engine 618 can be controlled by step 656. For example, supplemental fuel can be automatically controlled to be introduced directly to engine 618 and/or plasma fuel converter 634 based on predetermined conditions.

As discussed above, electricity generated in generator 628 can be can be used to supply some or all of the electricity requirements 632a for waste conversion unit 602. Electricity can also be used for other electricity requirements in the system (see e.g. to supply electricity 632b to plasma fuel converter 634 as illustrated in FIG. 16). Alternatively, electricity 630 can be used for sale.

It should be appreciated by those skilled in the art that the specific embodiments disclosed above may readily be utilized as a basis for modifying or designing other structures for carrying out the same purpose of the present invention. For example, the use of a gas turbine can be employed in place of an internal combustion engine. In this embodiment, the gas turbine could be operated in an ultra lean mode which is facilitated by use of the hydrogen-rich gas. It would thus have a significantly reduced level of $NO_x$ production relative to a standard small electricity producing gas turbine. In addition, other types of waste conversion units that produce combustible gases could be modified to use ultra lean operation to ensure low $NO_x$ production. It should also be realized by those skilled in the art that such equivalent constructions do not depart from the spirit and scope of the invention as set forth in the appended claims.

What is claimed is:

1. A system for generating electricity, comprising:
    a waste conversion unit characterized in that waste material treated therein forms fuel gas comprising combustible gases suitable for combustion using a fuel gas to air ratio of between about 0.4–0.7 relative to a stoichiometric ratio;
    a gas turbine configured to receive and combust air and at least a portion of the fuel gas using a ratio of the fuel gas to the air of between about 0.4–0.7 relative to a stoichiometric ratio; and
    a generator configured to be driven by mechanical power produced by the gas turbine.

2. The system of claim 1, wherein the waste conversion unit is an integrated arc plasma-joule heated melter unit, comprising:
    means for generating an arc plasma on top of or within a molten pool in the unit; and
    means for providing volumetric joule heating in the molten pool, the means for generating the arc plasma and the means for providing volumetric joule heating configured such that each is separately and independently controlled during simultaneous operation.

3. The system of claim 1, wherein the waste conversion unit is an integrated arc plasma-joule heated melter unit, comprising:
    at least one arc plasma electrode;
    a first power supply source connected to the at least one arc plasma electrode and characterized in that an arc plasma generated between the at least one arc plasma electrode and a molten pool in the unit is on top of or within the molten pool;
    a plurality of joule heating electrodes; and
    a second power supply source connected to the plurality of joule heating electrodes and configured to provide volumetric joule heating in the common molten pool;
    wherein the first and second power supply sources are arranged such that each is separately and independently controlled without detrimental electrical interaction with one another.

4. The system of claim 3, wherein the unit includes at least two arc plasma electrodes connected to the first power supply source.

5. The system of claim 3, wherein the first power supply source is a DC power supply source and wherein the second power supply source is an AC power supply source that prevents the DC power supply source from affecting the AC power supply source and from affecting the joule heating to the molten pool, the AC power supply source comprising:

at least one transformer having a primary winding and at least one secondary winding;

at least one capacitor connected in series with the at least one secondary winding of the transformer and connected to a first of the plurality of the joule heating electrodes; and at least one saturable reactor or at least one solid state thyristor switch connected in series with the at least one secondary winding of the transformer and connected to a second of the plurality of joule heating electrodes.

6. The system of claim 5, wherein the capacitor is characterized so as to avoid undesired resonance and to prevent undesirable interaction between the AC and DC traversing the molten pool.

7. The system of claim 3, wherein the joule heated melter portion is configured to maintain the waste material in a molten state with sufficient electrical conductivity to facilitate restart of a transfer arc plasma.

8. The system of claim 1, wherein the waste conversion unit is an integrated arc plasma-joule heated melter unit, comprising:

at least one arc plasma electrode;

at least one first power supply source connected to the at least one arc plasma electrode and characterized in that an arc plasma generated between the at least one arc plasma electrode and a molten pool in the unit is on top of or within the molten pool;

a plurality of joule heating electrodes;

a second power supply source connected to the plurality of joule heating electrodes and configured to provide volumetric joule heating in the molten pool;

wherein the arc plasma is arranged to provide a dominant source of heat for the waste material to be treated in the unit.

9. The system of any of claims 1, 2, 3, 4, 5, 6, 7 or 8, further including a gas clean up unit configured to receive at least a portion of the fuel gas from the waste conversion unit, the gas clean up unit further configured to remove particulate from the fuel gas and to introduce the fuel gas into the gas turbine.

10. The system of claim 9, further including a source of supplemental fuel gas configured to be introduced into the gas turbine such that the ratio of the combination of the fuel gas and the supplemental fuel gas to the air is maintained at between about 0.4–0.7 relative to stoichiometric ratio.

11. The system of claim 10, wherein the gas clean up unit includes at least one scrubber.

12. The system of claim 9, wherein the gas clean up unit includes at least one scrubber.

13. The system of claim 1, further including a plasma fuel converter configured to produce hydrogen-rich gas and configured to introduce the hydrogen-rich gas into the gas turbine.

14. The system of claim 13, wherein the plasma fuel converter is configured to introduce the hydrogen-rich gas in turbine in an amount such that the ratio of the combination of the fuel gas and the supplemental fuel gas to the air is maintained at between about 0.4–0.7 relative to stoichiometric ratio.

15. The system of claim 14, further including a gas clean up unit configured to receive at least a portion of the fuel gas from the waste conversion unit, the gas clean up unit further configured to remove particulate from the fuel gas and to introduce the fuel gas into the gas turbine.

16. The system of claim 13, further including a gas clean up unit configured to receive at least a portion of the fuel gas from the waste conversion unit, the gas clean up unit further configured to remove particulate from the fuel gas and to introduce the fuel gas into the gas turbine.

17. A system for generating electricity, comprising:

a waste conversion unit characterized in that waste material treated therein forms fuel gas comprising combustible gases suitable for combustion using a fuel gas to air ratio of between about 0.4–0.7 relative to a stoichiometric ratio;

an internal combustion engine configured to receive and combust air and at least a portion of the fuel gas using a ratio of the fuel gas to the air of between about 0.4–0.7 relative to a stoichiometric ratio, the internal combustion engine further configured to operate using a compression ratio of between 12 to 15; and a generator configured to be driven by mechanical power produced by the internal combustion engine.

18. The system of claim 17, wherein the waste conversion unit is an integrated arc plasma-joule heated melter unit, comprising:

means for generating an arc plasma on top of or within a molten pool in the unit; and means for providing volumetric joule heating in the molten pool, the means for generating the arc plasma and the means for providing volumetric joule heating configured such that each is separately and independently controlled during simultaneous operation.

19. The system of claim 17, wherein the waste conversion unit is an integrated arc plasma-joule heated melter unit, comprising:

at least one arc plasma electrode;

a first power supply source connected to the at least one arc plasma electrode and characterized in that an arc plasma generated between the at least one arc plasma electrode and a molten pool in the unit is on top of or within the molten pool;

a plurality of joule heating electrodes; and a second power supply source connected to the plurality of joule heating electrodes and configured to provide volumetric joule heating in the common molten pool;

wherein the first and second power supply sources are arranged such that each is separately and independently controlled without detrimental electrical interaction with one another.

20. The system of claim 19, wherein the waste conversion unit includes at least two arc plasma electrodes connected to the first power supply source.

21. The system of claim 19, wherein the first power supply source is a DC power supply source and wherein the second power supply source is an AC power supply source that prevents the DC power supply source from affecting the AC power supply source and from affecting the joule heating to the molten pool, the AC power supply source comprising:

at least one transformer having a primary winding and at least one secondary winding;

at least one capacitor connected in series with the at least one secondary winding of the transformer and connected to a first of the plurality of the joule heating electrodes; and at least one saturable reactor or at least one solid state thyristor switch connected in series with the at least one secondary winding of the transformer and connected to a second of the plurality of joule heating electrodes.

22. The system of claim 21, wherein the capacitor characterized so as to avoid undesired resonance and to prevent undesirable interaction between the AC and DC traversing the molten pool.

23. The system of claim 19, wherein the joule heated melter portion is configured to maintain the waste material in a molten state with sufficient electrical conductivity to facilitate restart of a transfer arc plasma.

24. The system of claim 17, wherein the waste conversion unit is an integrated arc plasma-joule heated melter unit, comprising:

at least one arc plasma electrode;

at least one first power supply source connected to the at least one arc plasma electrode and characterized in that an arc plasma generated between the at least one arc plasma electrode and a molten pool in the unit is on top of within the molten pool;

a plurality of joule heating electrodes;

a second power supply source connected to the plurality of joule heating electrodes and configured to provide volumetric joule heating in the molten pool;

wherein the arc plasma is arranged to provide a dominant source of heat for the waste material to be treated in the unit.

25. The system of any of claims 17, 18, 19, 20, 21, 22, 23 or 24, further including a gas clean up unit configured to receive at least a portion of the fuel gas from the waste conversion unit, the gas clean up unit further configured to remove particulate from the fuel gas and to introduce the fuel gas to the internal combustion engine.

26. The system of claim 25, further including a source of supplemental fuel gas configured to be introduced into the gas turbine such that the ratio of the combination of the fuel gas and the supplemental fuel gas to the air is maintained at between about 0.4–0.7 relative to stoichiometric ratio.

27. The system of claim 26, wherein the gas clean up unit includes at least one scrubber.

28. The system of claim 25, wherein the gas clean up unit includes at least one scrubber.

29. The system of claim 17, further including a plasma fuel converter configured to produce hydrogen-rich gas and configured to introduce the hydrogen-rich gas into the internal combustion engine.

30. The system of claim 29, wherein the plasma fuel converter is configured to introduce the hydrogen-rich gas into the internal combustion engine in an amount such that the ratio of the combination of the fuel gas and the supplemental fuel gas to the air is maintained at between about 0.4–0.7 relative to stoichiometric ratio.

31. The system of claim 30, further including a gas clean up unit configured to receive at least a portion of the fuel gas from the waste conversion unit, the gas clean up unit further configured to remove particulate from the fuel gas and to introduce the fuel gas into the internal combustion engine.

32. The system of claim 29, further including a gas clean up unit configured to receive at least a portion of the fuel gas from the waste conversion unit, the gas clean up unit further configured to remove particulate from the fuel gas and to introduce the fuel gas into the internal combustion engine.

33. The system of claim 17, wherein $NO_x$ levels generated by the combustion of the combustible gases are at least 10 times lower than $NO_x$ levels generated by combustion of the combustible gases using a stoichiometric ratio.

34. The system of claim 25, wherein $NO_x$ levels generated by the combustion of the combustible gases are at least 10 times lower than $NO_x$ levels generated by combustion of the combustible gases using a stoichiometric ratio.

35. The system of claim 31, wherein the waste conversion unit is an integrated arc plasma-joule heated melter unit, comprising:

means for generating an arc plasma on top of or within a molten pool in the unit; and means for providing volumetric joule heating in the molten pool, the means for generating the arc plasma and the means for providing volumetric joule heating configured such that each is separately and independently controlled during simultaneous operation.

36. The system of claim 31, wherein the waste conversion unit is an integrated arc plasma-joule heated melter unit, comprising:

at least one arc plasma electrode;

a first power supply source connected to the at least one arc plasma electrode and characterized in that an arc plasma generated between the at least one arc plasma electrode and a molten pool in the unit is on top of or within the molten pool;

a plurality of joule heating electrodes; and a second power supply source connected to the plurality of joule heating electrodes and configured to provide volumetric joule heating in the common molten pool;

wherein the first and second power supply sources are arranged such that each is separately and independently controlled without detrimental electrical interaction with one another.

37. The system of claim 36, wherein the waste conversion unit includes at least two arc plasma electrodes connected to the first power supply source.

38. The system of claim 36, wherein the first power supply source is a DC power supply source and wherein the second power supply source is an AC power supply source that prevents the DC power supply source from affecting the AC power supply source and from affecting the joule heating to the molten pool, the AC power supply source comprising:

at least one transformer having a primary winding and at least one secondary winding;

at least one capacitor connected in series with the at least one secondary winding of the transformer and connected to a first of the plurality of the joule heating electrodes; and at least one saturable reactor or at least one solid state thyristor switch connected in series with the at least one secondary winding of the transformer and connected to a second of the plurality of joule heating electrodes.

39. The system of claim 38, wherein the capacitor is characterized so as to avoid undesired resonance and to prevent undesirable interaction between the AC and DC traversing the molten pool.

40. The system of claim 36, wherein the joule heated melter portion is configured to maintain the waste material in a molten state with sufficient electrical conductivity to facilitate restart of a transfer arc plasma.

41. A system for generating electricity, comprising:

a waste conversion unit characterized in that waste material treated therein forms fuel gas comprising combustible gases suitable for combustion using a fuel gas to air ratio of between about 0.4–0.7 relative to a stoichiometric ratio;

an internal combustion engine configured to receive and combust air and at least a portion of the fuel gas using a ratio of the fuel gas to the air of between about 0.4–0.7 relative to a stoichiometric ratio; and a generator configured to be driven by mechanical power produced by the internal combustion engine.

42. The system of claim 41, wherein the waste conversion unit is an integrated arc plasma-joule heated melter unit, comprising:

at least one arc plasma electrode;

at least one first power supply source connected to the at least one arc plasma electrode and characterized in that an arc plasma generated between the at least one arc plasma electrode and a molten pool in the unit is on top of or within the molten pool;

a plurality of joule heating electrodes;

a second power supply source connected to the plurality of joule heating electrodes and configured to provide volumetric joule heating in the molten pool;

wherein the arc plasma is arranged to provide a dominant source of heat for the waste material to be treated in the unit.

43. The system of any of claims 41, 35, 36, 37, 38, 39, 40 or 42, further including a gas clean up unit configured to receive at least a portion of the fuel gas from the waste conversion unit, the gas clean up unit further configured to remove particulate from the fuel gas and to introduce the fuel gas to the internal combustion engine.

44. The system of claim 43, further including a source of supplemental fuel gas configured to be introduced into the gas turbine such that the ratio of the combination of the fuel gas and the supplemental fuel gas to the air is maintained at between about 0.4–0.7 relative to stoichiometric ratio.

45. The system of claim 44, wherein the gas clean up unit includes at least one scrubber.

46. The system of claim 43, wherein the gas clean up unit includes at least one scrubber.

47. The system of claim 41, further including a plasma fuel converter configured to produce hydrogen-rich gas and configured to introduce the hydrogen-rich gas into the internal combustion engine.

48. The system of claim 47, wherein the plasma fuel converter is configured to introduce the hydrogen-rich gas into the internal combustion engine in an amount such that the ratio of the combination of the fuel gas and the supplemental fuel gas to the air is maintained at between about 0.4–0.7 relative to stoichiometric ratio.

49. The system of claim 48, further including a gas clean up unit configured to receive at least a portion of the fuel gas from the waste conversion unit, the gas clean up unit further configured to remove particulate from the fuel gas and to introduce the fuel gas into the internal combustion engine.

50. The system of claim 47, further including a gas clean up unit configured to receive at least a portion of the fuel gas from the waste conversion unit, the gas clean up unit further configured to remove particulate from the fuel gas and to introduce the fuel gas into the internal combustion engine.

51. The system of claim 41, wherein $NO_x$ levels generated by the combustion of the combustible gases are at least 10 times lower than $NO_x$ levels generated by combustion of the combustible gases using a stoichiometric ratio.

52. The system of claim 43, wherein $NO_x$ levels generated by the combustion of the combustible gases are at least 10 times lower than $NO_x$ levels generated by combustion of the combustible gases using a stoichiometric ratio.

53. A method for generating electricity, comprising:

introducing waste material into a waste conversion unit such that fuel gas comprising;

cleaning the fuel gas in a gas clean up unit to remove particulate from the fuel gas; and combusting at least a portion of the fuel gas using a ratio of the fuel gas to air of between about 0.4–0.7 relative to a stoichiometric ratio.

54. The method of claim 53, wherein the step of combusting is in a gas turbine.

55. The method of claim 53, wherein the step of combusting is in an internal combustion engine.

56. The method of any of claims 53, 54 or 55, wherein the step of cleaning includes using at least one scrubber.

* * * * *